US010333700B2

(12) United States Patent
Garay et al.

(10) Patent No.: US 10,333,700 B2
(45) Date of Patent: Jun. 25, 2019

(54) METHOD AND SYSTEM FOR EXCHANGING CRYPTOGRAPHIC KEYS WITH AN UNAUTHENTICATED DEVICE

(71) Applicant: OATH INC., New York, NY (US)

(72) Inventors: Juan Garay, San Francisco, CA (US); Payman Mohassel, San Jose, CA (US); David Gil, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/055,368

(22) Filed: Aug. 6, 2018

(65) Prior Publication Data

US 2018/0343112 A1    Nov. 29, 2018

Related U.S. Application Data

(62) Division of application No. 14/853,087, filed on Sep. 14, 2015, now Pat. No. 10,069,623.

(51) Int. Cl.
| | |
|---|---|
| H04L 9/08 | (2006.01) |
| H04L 29/06 | (2006.01) |
| H04W 12/04 | (2009.01) |
| G09C 5/00 | (2006.01) |

(52) U.S. Cl.
CPC .............. H04L 9/0819 (2013.01); G09C 5/00 (2013.01); H04L 9/0841 (2013.01); H04L 9/0861 (2013.01); H04L 63/061 (2013.01); H04W 12/04 (2013.01)

(58) Field of Classification Search
CPC ... H04L 9/0819; H04L 63/061; H04L 9/0861; H04W 12/04
USPC ........................................................ 713/171
See application file for complete search history.

(56) References Cited

U.S. PATENT DOCUMENTS

| 8,720,780 B2 | 5/2014 | Brown et al. | |
|---|---|---|---|
| 10,069,623 B2* | 9/2018 | Garay | H04L 9/0819 |
| 2006/0088166 A1 | 4/2006 | Karusawa | |
| 2013/0198816 A1 | 8/2013 | Bohli et al. | |
| 2013/0332739 A1 | 12/2013 | Yi et al. | |
| 2017/0078090 A1* | 3/2017 | Garay | H04L 9/0819 |

OTHER PUBLICATIONS

Christian Gehrmann et al., "Manual authentication for wireless devices," Jan. 23, 2004.
Jonathan M. McCune et al., "Seeing-Is-Believing: Using Camera Phones for Human-Verifiable Authentication," Security and Privacy, 2005 IEEE Symposium, May 8-11, 2005, pp. 110-124.
Nitesh Saxena et al., "Secure Device Pairing based on a Visual Channel," Security and Privacy, 2006 IEEE Symposium, May 21-26, 2006.

\* cited by examiner

*Primary Examiner* — Baotran N To
(74) *Attorney, Agent, or Firm* — Pillsbury Winthrop Shaw Pittman LLP

(57) ABSTRACT

The present teaching relates to exchanging a key with a device. In one example, a secret value is generated. A message is transmitted to the device. The message includes information related to the secret value based on which the device is to create a cryptographic key. A visual code displayed on the device is captured. The visual code includes a first piece of information and a second piece of information. A key value is generated based on the first piece of information and the secret value. A test value is calculated based on the key value. It is determined whether the device is securely connected based on the test value.

20 Claims, 15 Drawing Sheets

METHOD AND SYSTEM FOR EXCHANGING CRYPTOGRAPHIC KEYS WITH AN UNAUTHENTICATED DEVICE

CROSS-REFERENCE TO RELATED APPLICATION

The present patent application is a division of U.S. patent application Ser. No. 14/853,087 filed Sep. 14, 2015, which is incorporated herein by reference in its entirety.

BACKGROUND

1. Technical Field

The present teaching relates to methods, systems, and programming for cryptography. Particularly, the present teaching is directed to methods, systems, and programming for exchanging a cryptographic key with an unauthenticated device.

2. Discussion of Technical Background

As the Internet grows and computers become widely available, cryptography becomes more and more important for secure communication in the presence of adversaries. Nowadays, personal devices can be equipped with a secure application to perform communications in a trust network, such as secure access to personal data, or secure end-to-end (E2E) messaging or email. Typically, one user may have access to multiple devices, e.g. a desktop that is convenient to use at home and a smartphone that is convenient to use at work or on a trip. A user having a trusted device in a trust network may purchase a new device and want to expand trust from the trusted device to the new untrusted device.

Most existing techniques for trust expansion try to exchange a key over an insecure channel, e.g. over the Internet where any intermediate party can eavesdrop the key, or assume that the key exchange is facilitated by a fully-trusted server. Another way of trust expansion is to physically transfer the key from the trusted device to the untrusted device, e.g. using a floppy disk or a flash drive, which may be impossible or difficult for a user to handle because the two devices can have different connection standards.

Therefore, there is a need to develop techniques to exchange a key between a trusted device and a new or unauthenticated device to overcome the above drawbacks.

SUMMARY

The present teaching relates to methods, systems, and programming for cryptography. Particularly, the present teaching is directed to methods, systems, and programming for exchanging a cryptographic key with a device.

In one example, a method, implemented on a machine having at least one processor, storage, and a communication platform capable of connecting to a network for exchanging a key with a device is disclosed. A secret value is generated. A message is transmitted to the device. The message includes information related to the secret value based on which the device is to create a cryptographic key. A visual code displayed on the device is captured. The visual code includes a first piece of information and a second piece of information. A key value is generated based on the first piece of information and the secret value. A test value is calculated based on the key value. It is determined whether the device is securely connected based on the test value.

In another example, a method, implemented on a machine having at least one processor, storage, and a communication platform capable of connecting to a network for exchanging a key with a device is disclosed. A message is received from the device. A secret value is generated. A cryptographic key is created based on the message and the secret value. A visual code is generated based on the secret value. The visual code includes a first piece of information and a second piece of information. The visual code displayed to be captured by the device. The device is to calculate a test value based on the first piece of information and determine whether the device is securely connected based on the test value.

In yet another example, a system for exchanging a key with a device is disclosed. The system comprises a secret value, a communication unit, a scanning unit, a key value generator, a function value generator, and a key exchange accomplishment examiner. The secret value generator is configured for generating a secret value. The communication unit is configured for transmitting a message to the device. The message includes information related to the secret value based on which the device is to create a cryptographic key. The scanning unit is configured for capturing a visual code displayed on the device. The visual code includes a first piece of information and a second piece of information. The key value generator is configured for generating a key value based on the first piece of information and the secret value. The function value generator is configured for calculating a test value based on the key value. The key exchange accomplishment examiner is configured for determining whether the device is securely connected based on the test value In a different example, a system for exchanging a key with a device is disclosed. The system comprises a communication unit, a secret value generator, a key value generator, a visual code generator, and an input/output unit. The communication unit is configured for receiving a message from the device. The secret value generator is configured for generating a secret value. The key value generator is configured for creating a cryptographic key based on the message and the secret value. The visual code generator is configured for generating a visual code based on the secret value. The visual code includes a first piece of information and a second piece of information. The input/output unit is configured for displaying the visual code which is to be captured by the device. The device is to calculate a test value based on the first piece of information and determine whether the device is securely connected based on the test value.

Other concepts relate to software for implementing the present teaching on key exchanges. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for exchanging a key with a device is disclosed. The medium, when read by the machine, causes the machine to perform the following. A secret value is generated. A message is transmitted to the device. The message includes information related to the secret value based on which the device is to create a cryptographic key. A visual code displayed on the device is captured. The visual code includes a first piece of information and a second piece of information. A key value is generated based on the first piece of information and the secret value. A test value is calculated based on the key value. It is determined whether the device is securely connected based on the test value.

In another example, a machine-readable, non-transitory and tangible medium having data recorded thereon for exchanging a key with a device is disclosed. The medium, when read by the machine, causes the machine to perform the following. A message is received from the device. A secret value is generated. A cryptographic key is created based on the message and the secret value. A visual code is generated based on the secret value. The visual code includes a first piece of information and a second piece of information. The visual code displayed to be captured by the device. The device is to calculate a test value based on the first piece of information and determine whether the device is securely connected based on the test value.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
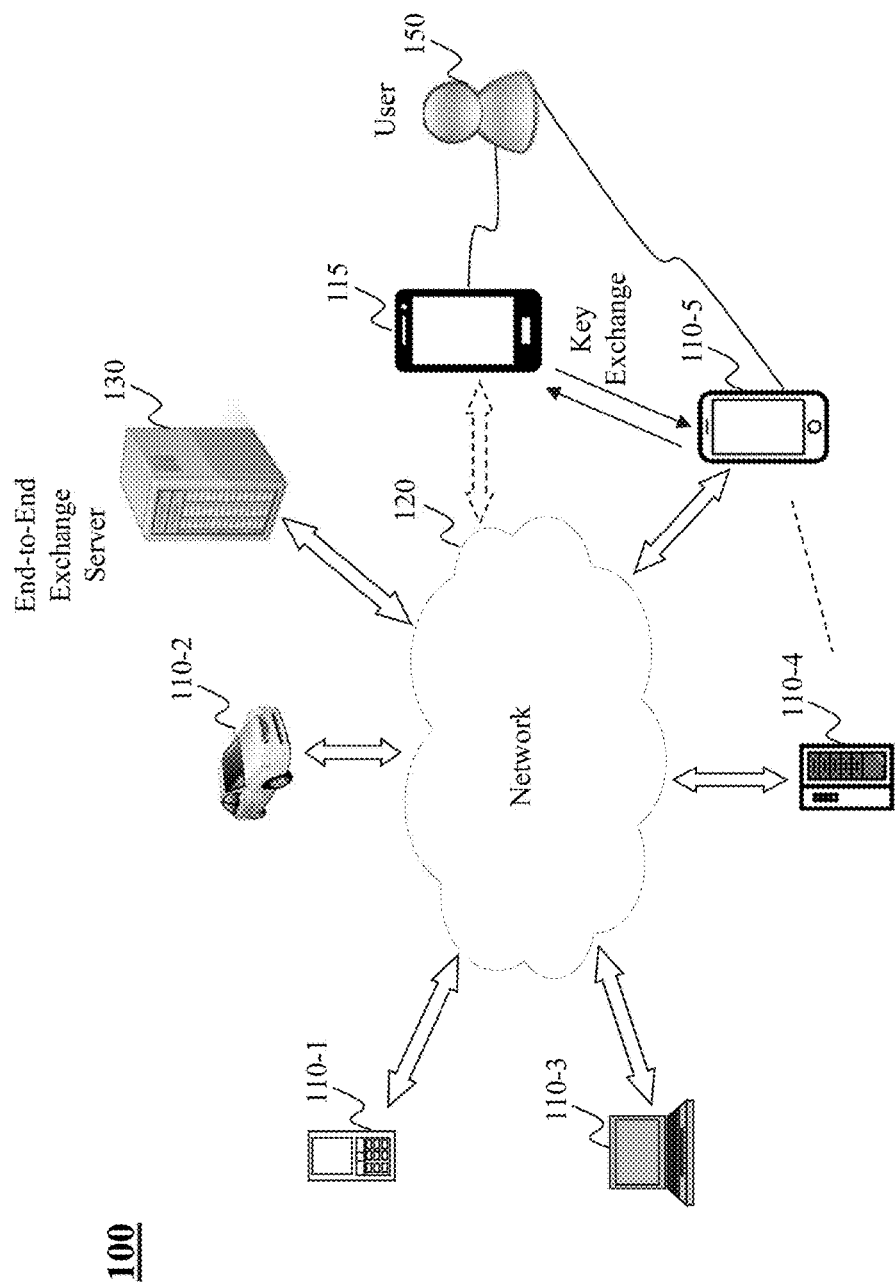
FIG. 1 is a high level depiction of an exemplary networked environment for exchanging a cryptographic key with a device, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of exchanging a cryptographic key with a device. The method and system as disclosed herein aim at expanding trust from a trusted device to an untrusted device in a secure and efficient manner.

A user may want to add a device into a trust network for end-to-end communications with other devices in the trust network. To expand trust to the newly added device, a cryptographic key may be exchanged between the newly added device and a trusted device. The key exchange may be facilitated by an exchange server that is often untrusted itself.

In the present teaching, the trusted device can display a visual code of a message, e.g., by means of a quick response (QR) code, while the untrusted device may be able to capture it, e.g., by means of scanning the visual code with a camera. Accordingly, the trusted device may be called a displayer and the untrusted device may be called a scanner. According to an embodiment, the devices are able to exchange a cryptographic key, by one or more communications over an untrusted network connection, a one-time visual channel communication, and a one-time confirmation with help of the user. The key exchange scheme in this embodiment can withstand an active attacker on the untrusted network connection and a shoulder-surfer attacker who may eavesdrop the visual channel and mount a man-in-the-middle attack on the network. The security of the scheme relies on the security of the visual channel, the decisional Diffie-Hellman assumption (DDH), the hardness of pseudorandom functions (in practice, the security of a block cipher), and the security of a key derivation function. In addition, the number of message exchanges has been minimized to improve efficiency without losing security and effectiveness.

An adversary may launch a denial of service (DoS) attack by sending many group elements to overwhelm the displayer. To counteract this attack, another key exchange scheme in the present teaching utilizes the security of a message authentication code, according to another embodiment. To attack in this scheme, the DoS attacker has to be physically present at the time of the interaction between the devices to capture the visual code, which is extremely difficult if not impossible for the DoS attacker.

While the trusted device is the displayer in one embodiment, it is also possible to make the scanner the trusted device in another embodiment without changing the key exchange schemes. The trusted device in the present teaching can be offline with no connection to an application server. For example, the one or more communications over an untrusted network connection can be prepared and stored on the untrusted application server beforehand when the trusted device is online, but the rest of the exchange scheme can take place offline.

The terms "key" and "cryptographic key" may be used interchangeably herein. The terms "trusted device" and "authenticated device" may be used interchangeably herein. The terms "untrusted device" and "unauthenticated device" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for exchanging a cryptographic key with a device, according to an embodiment of the present teaching. In FIG. 1, the exemplary networked environment 100 includes one or more trusted devices 110-1, 110-2, 110-3, 110-4, 110-5, a network 120, an end-to-end exchange server 130, an untrusted device 115, and a user 150. The network 120 may be a trust network where the trusted devices can communicate to each other securely, e.g. by encrypted emails, encrypted messages, etc., with or without the end-to-end exchange server 130. The network 120 may be in form of a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

The trusted devices may be of different types such as desktop computers 110-4, laptop computers 110-3, a built-in device in a motor vehicle 110-2, a mobile device 110-1, or a smartphone 110-5. A trusted device may be connected to the network 120 and able to communicate with another trusted device via the end-to-end exchange server 130. This kind of end-to-end communication can be secure with a long term secret key shared by all of the trusted devices connected to the network 120.

The end-to-end exchange server 130 may be a server that can help exchanging data or messages between any two trusted devices. The end-to-end exchange server 130 may be provided by an online service provider or content provider owned by an entity, whether an individual, a firm, or an organization. Examples of content providers include, but are not limited to, online news providers (e.g., The New York Times, The Wall Street Journal, Reuters, CNN, etc.), blogs (Tumblr, The Huffington Post, The Daily Beast, The Daily Caller, Tech Crunch, etc.), online game providers (e.g., Gaikai, OnLive, Playcast Media Systems, Zynga, etc.), massive online open courses (or MOOCs, e.g., Coursera, SlideRule, Khan Academy, Udemy, etc.), entertainment websites (e.g., ESPN, Hulu, Netflix, etc.), online database providers (e.g., IMDb, Wikipedia, etc.), content aggregators (e. g, Drudge Report, Squidoo, Slashdot, eHow, etc.), web portals (e.g., Yahoo!, Aol, Rediff, MSN, etc.), media hosting services (e.g., Youtube, Vimeo, GoFish, Veoh, etc.) and so forth.

The user 150 may have access to both the untrusted device 115 and the trusted device 110-5. For example, after using the smartphone 110-5 for a couple of years, the user 150 purchases a new smartphone 115. The user 150 may want to add the untrusted device 115 into the network 120 for secure communications with the trusted devices. In this case, the trusted device 110-5 may exchange a key with the untrusted device 115 to establish a secure connection between the trusted device 110-5 and the untrusted device 115. The key exchange may be controlled by an application installed on both the trusted device 110-5 and the untrusted device 115. Once the key is securely exchanged, the trusted device 110-5 may use the key to encrypt and exchange the long term secret key with the untrusted device 115, such that the untrusted device 115 can join the trust network 120 and communicate securely with the trusted devices on the network 120 using the long term secret key.

In this embodiment, the key exchange may be facilitated by the end-to-end exchange server 130, which can help forwarding messages between the trusted device and the untrusted device. The end-to-end exchange server 130 itself may not be trusted. The key exchange schemes in the present teaching do not rely on a trusted server.

Figure 2:
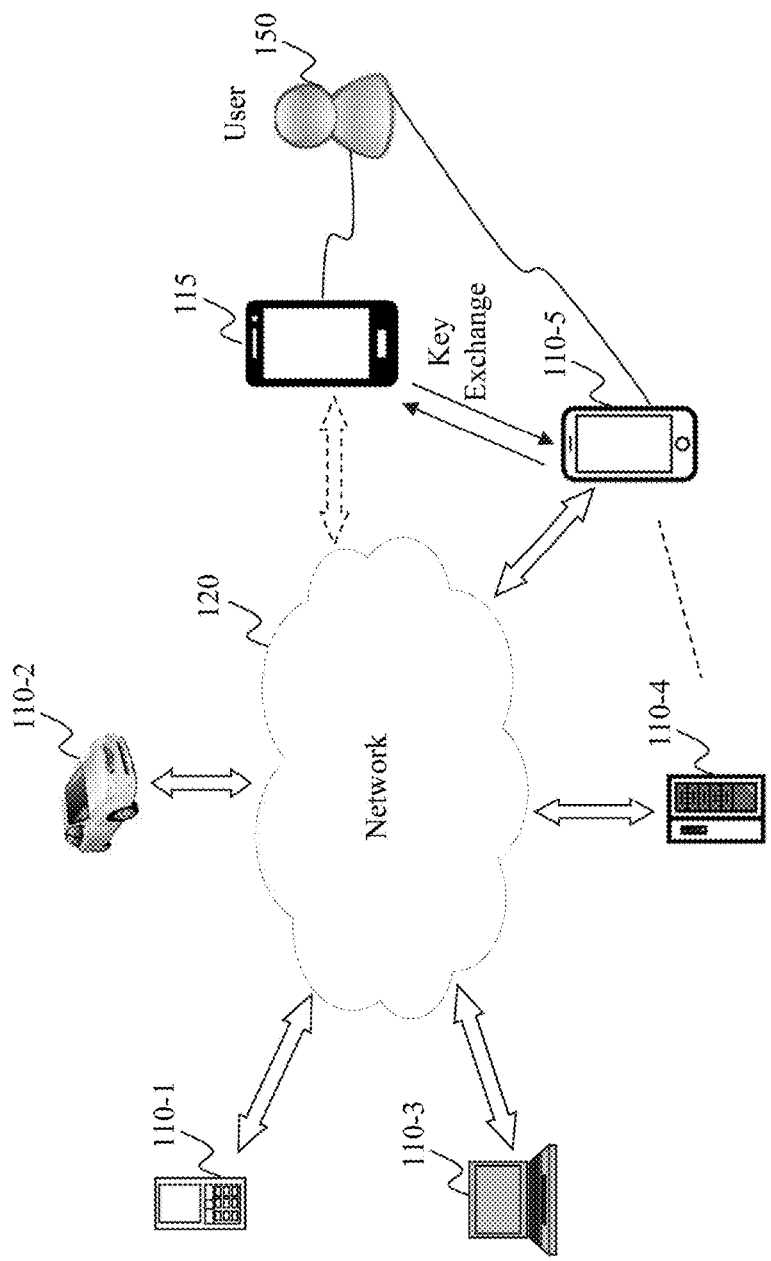
FIG. 2 is a high level depiction of another exemplary networked environment for exchanging a cryptographic key with a device, according to an embodiment of the present teaching.

FIG. 2 is a high level depiction of another exemplary networked environment 200 for exchanging a cryptographic key with a device, according to an embodiment of the present teaching. The exemplary networked environment 200 in this embodiment is similar to the exemplary networked environment 100 in FIG. 1, except that there is no server involved in the networked environment 200 or no copy of the long term secret key is stored at any server. In this scenario, the trusted devices 110-1, 110-2, 110-3, 110-4, 110-5 may communicate securely to each other over the network 120 without help of any server.

In this embodiment, the key exchange may be performed without an end-to-end exchange server. For example, part of the key exchange may be based on Bluetooth or near field communication (NFC) techniques.

Figure 3:
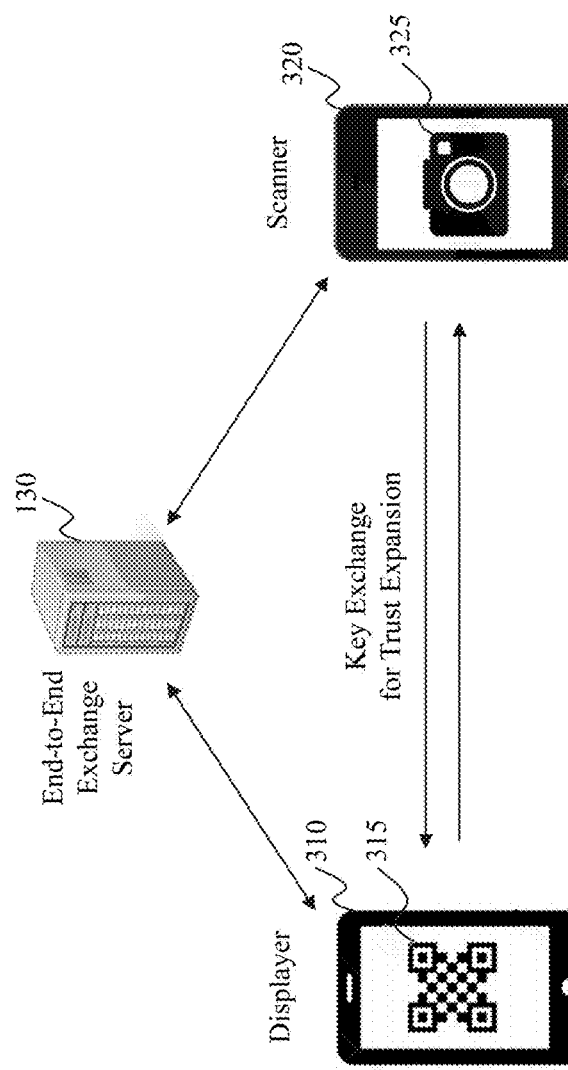
FIG. 3 illustrates an example of key exchange between a displayer and a scanner for trust expansion, according to an embodiment of the present teaching.

FIG. 3 illustrates an example of key exchange between a displayer 310 and a scanner 320 for trust expansion, according to an embodiment of the present teaching. In this embodiment, the displayer 310 can display a visual code, e.g. a QR code 315, on its screen, while the scanner 320 can capture the visual code, e.g. with a camera 325 on the scanner 320. A visual code may be a one-dimensional barcode like Universal Product Code (UPC) or a two-dimensional barcode like Aztec code or QR code. Any information related to key exchange can be encoded into a visual code. The visual code displayed on the displayer 310 may be captured or scanned by the scanner 320, e.g. when a user holds the camera of the scanner 320 on top of the visual code displayed on the displayer 310. In this manner, the information included in the visual code is securely transferred from the displayer 310 to the scanner 320, because it is very difficult for any eavesdropper to capture the visual code without authorization from the user.

In this embodiment, the key exchange between the displayer 310 and the scanner 320 can be facilitated by the end-to-end exchange server 130 which may be untrusted itself. As to be described later, although the key exchange scheme includes some insecure communication with the aid of the end-to-end exchange server 130, the key can still be securely exchanged in the present teaching.

Referring to the above examples in FIG. 1 and FIG. 2, one of the displayer 310 and the scanner 320 may be a trusted device and the other one may be an untrusted device trying to join the trust network by exchanging a key with the trusted device.

Figure 4:
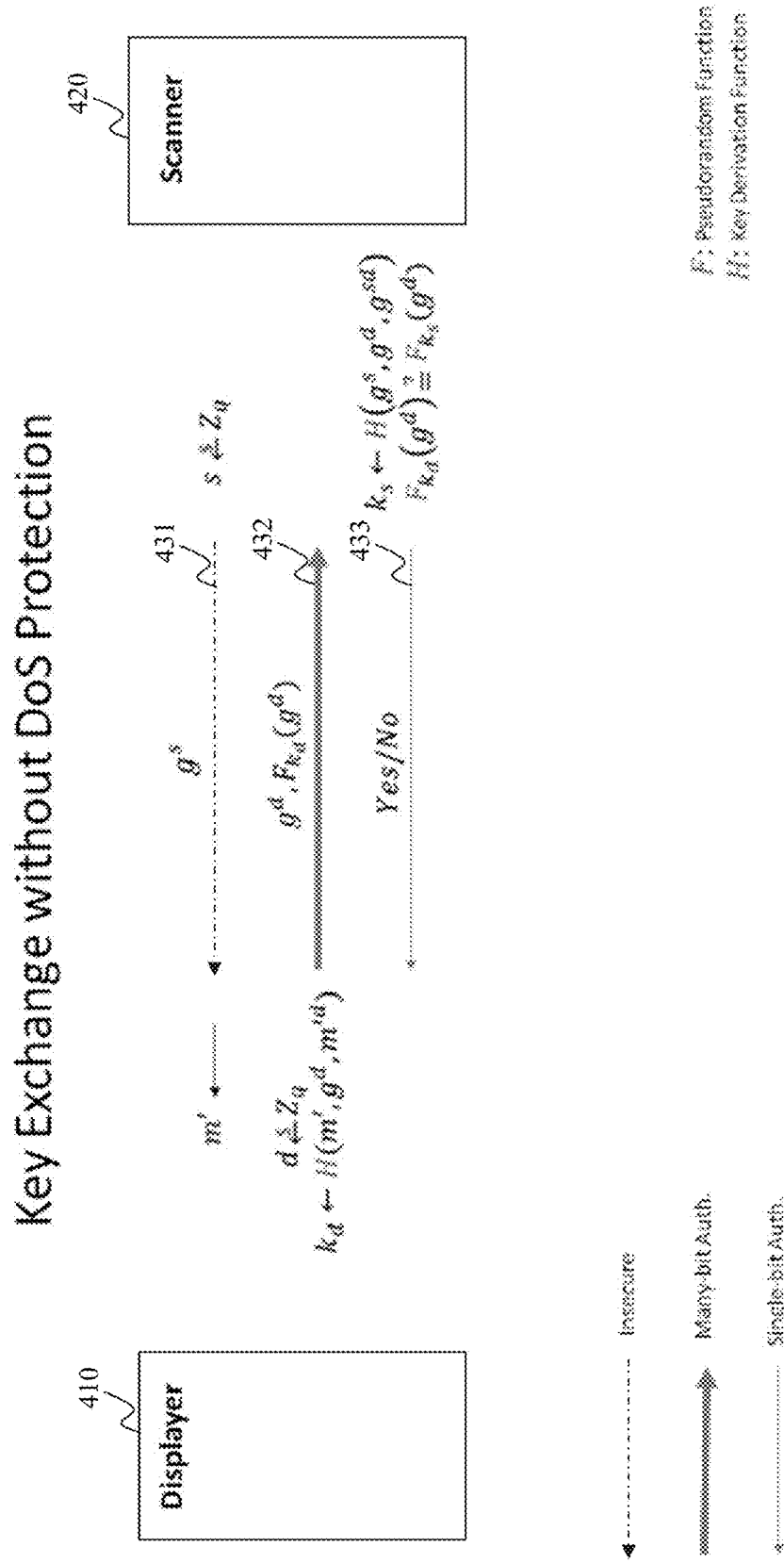
FIG. 4 illustrates an exemplary scheme of key exchange between a displayer and a scanner, according to an embodiment of the present teaching.

FIG. 4 illustrates an exemplary scheme of key exchange between a displayer and a scanner, according to an embodiment of the present teaching. In this example, the displayer 410 and the scanner 420 are exchanging a key to each other, such that they can build trust to each other and expand trust of a secure network from one to the other. An application may be installed on both the displayer 410 and the scanner 420 and executed to facilitate the key exchange. For example, after the scanner 420 receives a request for exchanging a key with the displayer 410, the scanner 420 may generate a secret value s. The request may come from a user activating the application. The secret value s may be a random number generated by the scanner 420, e.g. based on a function that generates uniformity at random from the domain of integers.

As shown in FIG. 4, there are three steps of communications between the displayer 410 and the scanner 420. In the description below regarding FIG. 4, it will be assumed that the trusted device is the displayer 410, and the untrusted device is the scanner 420. But it can be understood that these roles can be reversed in other scenarios, such that the trusted device is the scanner 420, and the untrusted device is the displayer 410, without changing the key exchange scheme.

In the first step 431, the scanner 420 sends a message including the value $g^s$ to the displayer 410. The value g may be a public parameter of the scheme, such that g can be sent to the scanner 420 beforehand. The first step 431 may be performed over an untrusted or insecure network connection, where many intermediate parties may eavesdrop the communication. In one embodiment, the first step 431 may be facilitated by an untrusted exchange server which can receive the message sent by the scanner 420 and forward the message to the displayer 410.

After the first step 431, the displayer 410 can analyze the received message m' to obtain the secret value s. The displayer 410 may then randomly generate another secret value d, and then calculate the parameter $g^d$ and the key value $g^{sd}$ which will be used for secure communication between the displayer 410 and the scanner 420. The displayer 410 may also generate a parameter $k_d$ based on a key derivation function H, e.g. by $k_d=H(m', g^d, m'^d)$. The displayer 410 can then calculate the value $F_{kd}(g^d)$ based on a random function F, e.g. a pseudorandom function, and the parameter $k_d$. The value $F_{kd}(g^d)$ will be used by the scanner 420 for determining whether the key exchange is successful or not.

In the second step 432, the displayer 410 may encode both the parameter $g^d$ and the value $F_{kd}(g^d)$ into a visual code and display the visual code on its screen, such that the scanner 420 can capture the visual code. As discussed above, this kind of visual channel communication can be very secure as in practice almost no one can physically interfere with the visual code capturing or fake a visual code for the scanner 420 to capture. The visual code may include multiple bits as it includes information of both the parameter $g^d$ and the value $F_{kd}(g^d)$.

After the second step 432, the scanner 420 can extract the parameter $g^d$ and the value $F_{kd}(g^d)$ from the captured visual code. The scanner 420 may then calculate the key value $g^{sd}$ based on the parameter $g^d$. Based on the parameters $g^s$, $g^d$, $g^{sd}$, and the key derivation function H, the scanner 420 may generate a parameter $k_s$ and calculate the value $F_{ks}(g^d)$ based on the random function F for determining whether the key exchange is successful. If the communications so far are honest and correct, the calculated value $F_{ks}(g^d)$ will be equal to the value $F_{kd}(g^d)$ extracted from the visual code, and the key value $g^{sd}$ can be confirmed to be correct key between the displayer 410 and the scanner 420. In this case, the scanner 420 may provide an indication to indicate that the displayer 410 and the scanner 420 are securely connected with the key $g^{sd}$. On the other hand, if there is some error in the previous communications, e.g. caused by some adversary during the insecure connection at the first step 431, the calculated value $F_{ks}(g^d)$ will not be equal to the value $F_{kd}(g^d)$ extracted from the visual code, and the key value $g^{sd}$ should be dropped and cannot be used as the key between the displayer 410 and the scanner 420. In this case, the scanner 420 may provide an indication to indicate that the key exchange fails and the displayer 410 and the scanner 420 are not securely connected.

In either case, the scanner 420 will provide an indication regarding whether the two devices are securely connected with a key after the second step 432. At the third step 433, this indication may be sent to the displayer 410 as a confirmation. In one embodiment, a user who observes the indication from the scanner 420 may provide an input on the displayer 410 such that the indication is forwarded to the displayer 410. For example, the displayer 410 shows two buttons: "YES" and "NO", on its screen after the second step 432. If the user sees the indication indicating that the key exchange is successful (i.e. the two devices are securely connected with the key), the user may press a "YES" button shown on the screen of the displayer 410 as a confirmation. On the other hand, if the user sees the indication indicating that the key exchange is not successful (i.e. the two devices are not securely connected with the key), the user may press a "NO" button shown on the screen of the displayer 410 as a confirmation. In another example, instead of showing both "YES" and "NO" buttons, the displayer 410 shows only one button, e.g. the "YES" button, such that unless the user presses the "YES" button to confirm a successful key exchange within a certain time period, the displayer 410 will determine the key exchange to be unsuccessful. The third step 433 may be a single bit communication as essentially one bit of information ("YES"! "NO") is sent to the displayer 410.

The key exchange scheme shown in FIG. 4 can withstand an active attacker on the untrusted network connection during the first step 431, because it is difficult for the active attacker to obtain s based on $g^s$ and the active attacker does not know d to generate the key $g^{sd}$. This security can rely on the DDH assumption, under which it is hard to compute $g^{sd}$ based on $g^s$ and $g^d$. The key exchange scheme shown in FIG. 4 can also withstand a shoulder-surfer attacker who may eavesdrop the visual channel (the second step 432) and mount a man-in-the-middle attack on the network, because it is difficult for the shoulder-surfer attacker to obtain d based on $g^d$ and the shoulder-surfer attacker does not know s to generate the key $g^{sd}$, based on the DDH assumption. In addition, even if the shoulder-surfer attacker generates a fake $g^s$ during the first step 431 or a fake $g^d$ during the second step 432, the scanner 420 will determine that $F_{ks}(g^d)$ is not equal to $F_{kd}(g^d)$ and indicate that the two devices are not securely connected with a key. This security can rely on the hardness of pseudorandom function F and the security of the key derivation function H used for generating $k_d$ and $k_s$.

Without losing security and effectiveness, the key exchange scheme in FIG. 4 includes just three steps, with little effort from the user, to improve efficiency.

The trusted device in the present teaching can be offline with no connection to an application server. For example, the information exchanged in the first step 431 over an insecure connection can be prepared and stored on the untrusted application server beforehand when the trusted device is online, but the rest of the exchange scheme in FIG. 4 can take place offline.

Figure 5:
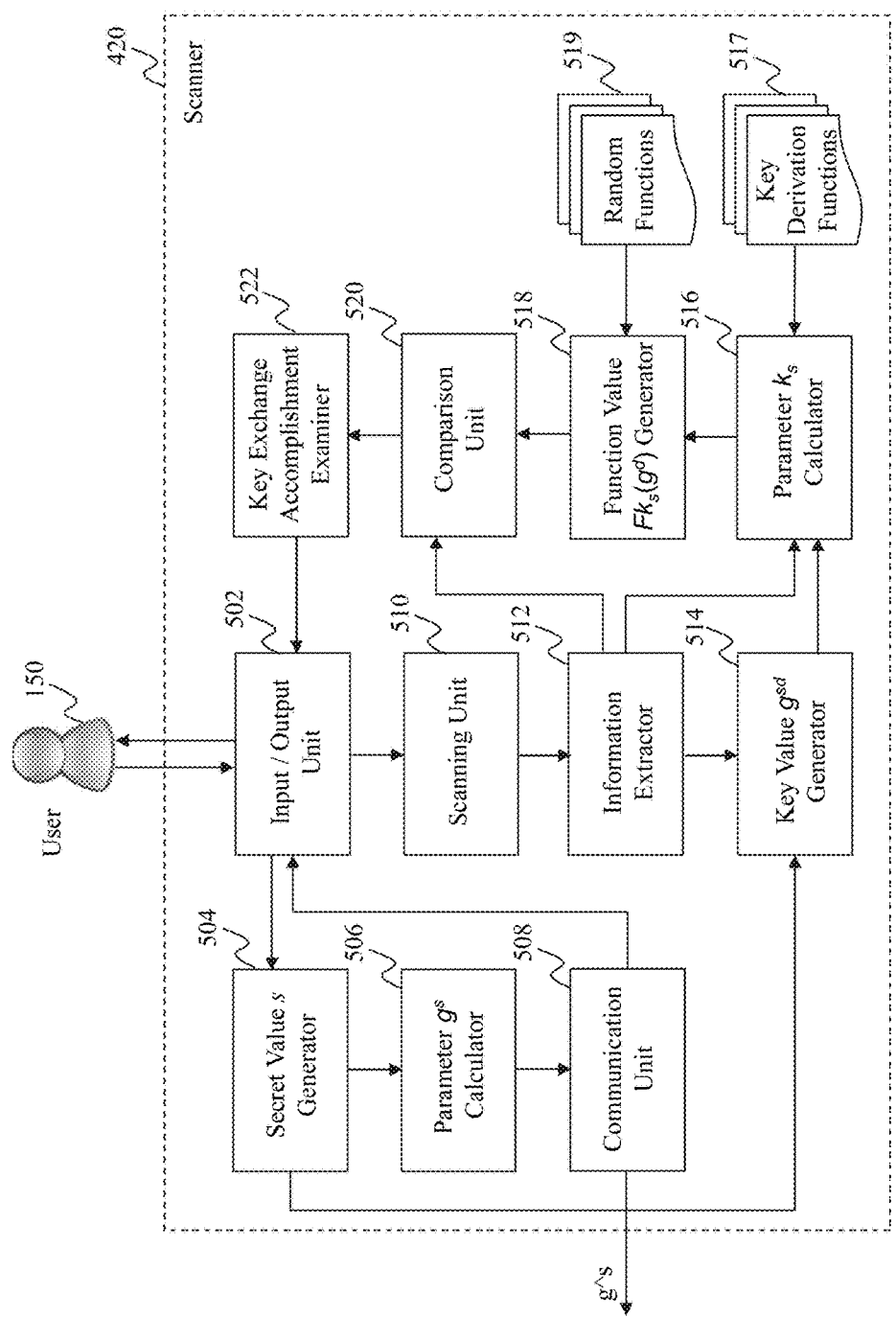
FIG. 5 illustrates an exemplary diagram of a scanner, according to an embodiment of the present teaching.

FIG. 5 illustrates an exemplary diagram of a scanner 420, according to an embodiment of the present teaching. The scanner 420 in this example includes an input/output unit 502, a secret value s generator 504, a parameter $g^s$ calculator 506, a communication unit 508, a scanning unit 510, an information extractor 512, a key value $g^{sd}$ generator 514, a parameter $k_s$ calculator 516, key derivation functions 517, a function value $F_{ks}(g^d)$ generator 518, random functions 519, a comparison unit 520, and a key exchange accomplishment examiner 522.

The input/output unit 502 in this example may receive a request from a user 150 for key exchange with a displayer, e.g. by receiving a user input activating an application stored on the scanner 420 to start a key exchange scheme as shown in FIG. 4. Upon receiving the request, the input/output unit 502 may activate the secret value s generator 504 to generate a secret value s, e.g. based on a function that generates uniformity at random from the domain of integers, and send the secret value s to the parameter $g^s$ calculator 506.

The parameter $g^s$ calculator 506 in this example receives the secret value s from the secret value s generator 504 and obtains the public parameter g to calculate the parameter $g^s$. The communication unit 508 may then transmit the parameter $g^s$ to the displayer, e.g. over an insecure connection on an untrusted network. After the transmission, the communication unit 508 may send a signal to the input/output unit 502. Upon receiving the signal, the input/output unit 502 may output an instruction to the user 150 for capturing a visual code to be displayed on the displayer (trusted device). For example, the instruction may include a sentence like "please turn on the camera to scan the QR code displayed on the displayer."

The scanning unit 510 in this example is configured for capturing a visual code displayed on the displayer, e.g. by scanning a QR code with a camera. The scanning unit 510 may be activated by the user following the instruction given via the input/output unit 502, or be activated by the input/output unit 502 directly. In the latter case, the instruction to the user may include a sentence like "please use this camera to scan the QR code displayed on the displayer." With the help of the user, the scanning unit 510 can capture the visual code which includes information about key exchange from the displayer, and send it to the information extractor 512.

The information extractor 512 in this example extracts information from the captured visual code, to obtain e.g. $g^d$ and $F_{kd}(g^d)$ as shown in FIG. 4. The information extractor 512 may send the $g^d$ to the key value $g^{sd}$ generator 514 for generating the key value $g^{sd}$, send the $g^d$ to the parameter $k_s$ calculator 516 for calculating the parameter $k_s$, and send the $F_{kd}(g^d)$ to the comparison unit 520 for comparing the $F_{kd}(g^d)$ with a generated function value $F_{ks}(g^d)$.

The key value $g^{sd}$ generator 514 in this example obtains the $g^d$ from the information extractor 512 and obtains the secret value s from the secret value s generator 504. The key value $g^{sd}$ generator 514 may generate the key value $g^{sd}$ based on the $g^d$ and the value s. The key value $g^{sd}$ generator 514 may then send the generated key value $g^{sd}$ and $g^s$ to the parameter $k_s$ calculator 516, as the public parameter can be pre-known to all units in the scanner 420.

The parameter $k_s$ calculator 516 in this example obtains the $g^d$ from the information extractor 512, and obtains the key value $g^{sd}$ and the value $g^s$ from the key value $g^{sd}$ generator 514. Based on those values, the parameter $k_s$ calculator 516 can calculate a parameter ks using one of the key derivation functions 517. The used key derivation function may be predetermined and shared by the scanner and the displayer.

Based on the parameter $k_s$, the function value $F_{ks}(g^d)$ generator 518 may generate a function value $F_{ks}(g^d)$, based on one of the random functions 519, e.g. a pseudorandom function that is predetermined and shared by the scanner and the displayer. The function value $F_{ks}(g^d)$ generator 518 may then send the function value $F_{ks}(g^d)$ as a test value to the comparison unit 520 for comparison with a check value.

The comparison unit 520 in this example receives the test value $F_{ks}(g^d)$ from the parameter $k_s$ calculator 516 and receives the check value $F_{kd}(g^d)$ extracted from the visual code by the information extractor 512. The comparison unit 520 may compare $F_{kd}(g^d)$ with $F_{ks}(g^d)$ to determine whether they are equal, and send the comparison result to the key exchange accomplishment examiner 522.

The key exchange accomplishment examiner 522 can determine whether the key exchange is successful based on the comparison result from the comparison unit 520. When $F_{kd}(g^d)$ equals $F_{ks}(g^d)$, the key exchange accomplishment examiner 522 may determine that the key exchange is accomplished successfully, and instruct the input/output unit 502 to output an indication that the two devices are securely connected to each other with a key. Then, the scanner 420 can use the key $g^{sd}$ to securely encrypt information to be communicated with the displayer. When $F_{kd}(g^d)$ does not equal $F_{ks}(g^d)$, the key exchange accomplishment examiner 522 may determine that the key exchange fails, and instruct the input/output unit 502 to output an indication that the two devices are not securely connected to each other with a key.

The input/output unit 502 may provide to the user 150 the corresponding indication based on the instruction from the key exchange accomplishment examiner 522, e.g. by an icon, a text, a voice, a shining light, a ring, a vibration, or an image. The indication may inform the user 150 the result of the key exchange and instruct the user 150 to forward the result to the displayer, e.g. by inputting on the displayer.

Figure 6:
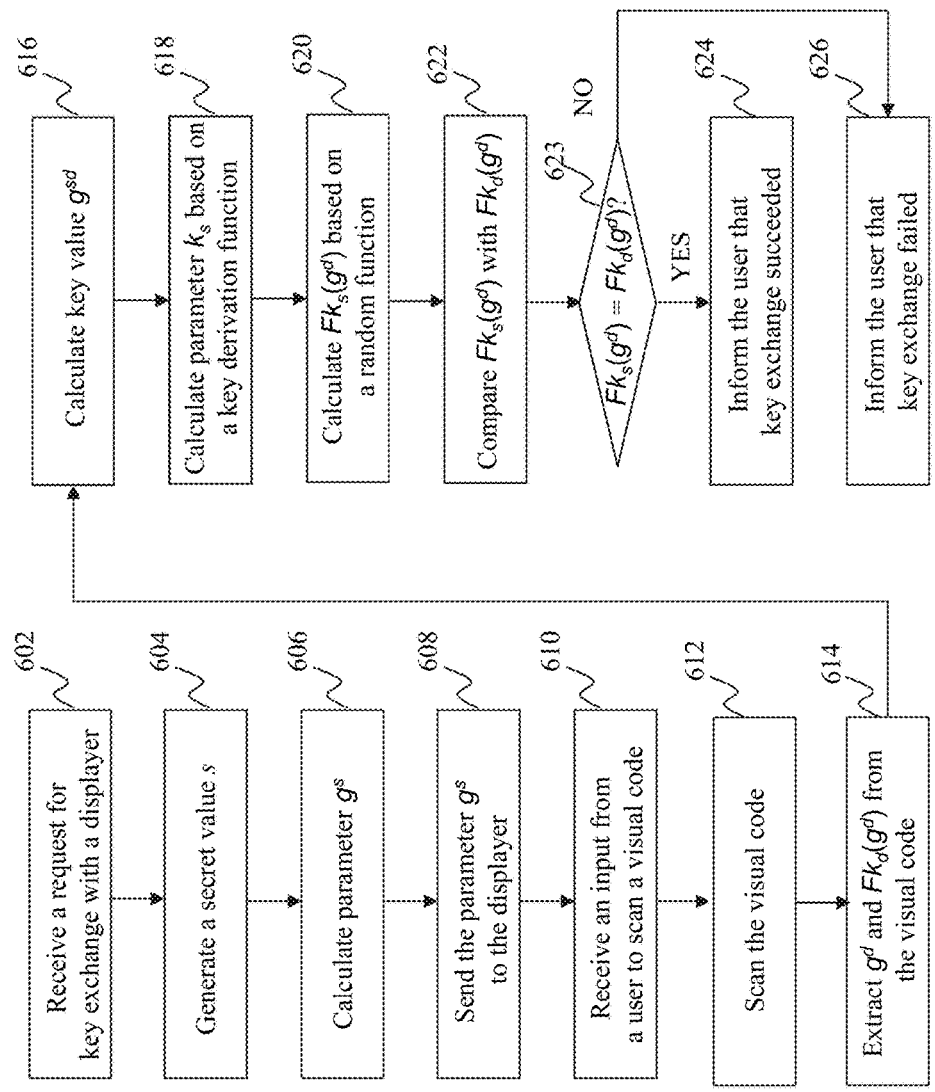
FIG. 6 is a flowchart of an exemplary process performed by a scanner, according to an embodiment of the present teaching.

FIG. 6 is a flowchart of an exemplary process performed by a scanner, according to an embodiment of the present teaching. For example, the scanner may be the scanner 420 in FIG. 5. At 602, a request for exchanging a key with a displayer is received, e.g. from a user having access to both the displayer and the scanner. A secret value s is generated at 604, e.g. based on a uniformity random function. At 606, a parameter $g^s$ is calculated based on the secret value s and a public parameter g. The parameter $g^s$ is sent to the displayer at 608, e.g. by a message via an insecure channel.

An input is received at 610 from the user to scan a visual code. In an embodiment, the user may be instructed to provide the input, e.g. after holding a camera on top of the visual code. The visual code is captured or scanned at 612. At 614, information is extracted from the captured visual code. The information may include $g^d$ and a check value $F_{kd}(g^d)$ for key exchange. A key value $g^{sd}$ is then generated at 616, based on the $g^d$ and the secret value s. At 618, a parameter $k_s$ is calculated based on a key derivation function. At 620, a test value $F_{ks}(g^d)$ is calculated based on a random function, e.g. a pseudorandom function. The test value $F_{ks}(g^d)$ is compared with the check value $F_{kd}(g^d)$ at 622 and it is determined whether the $F_{ks}(g^d)$ is equal to the $F_{kd}(g^d)$ at 623. If so, the process goes to 624, where the user is informed that the key exchange is successful by an indication. Otherwise, the process goes to 626, where the user is informed that the key exchange fails by another indication.

Figure 7:
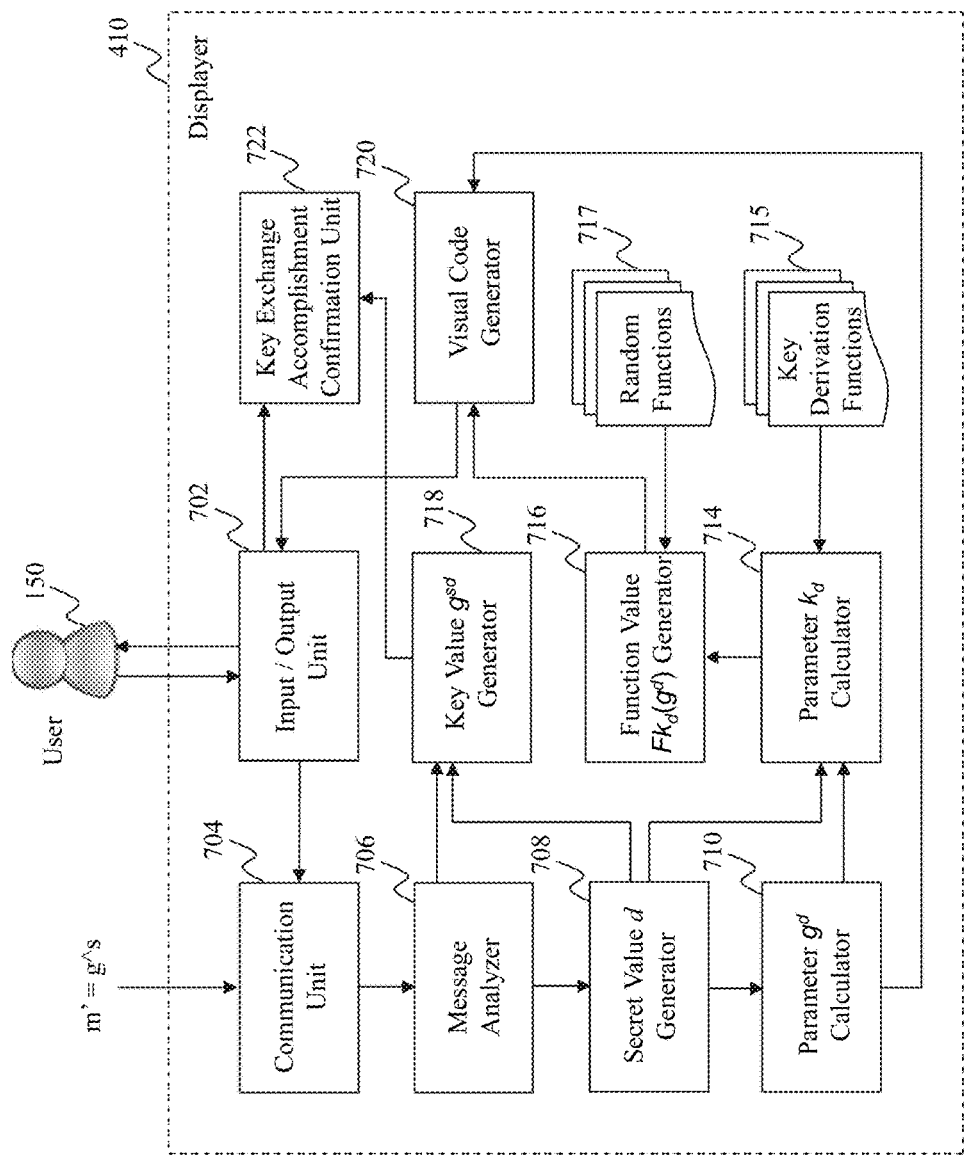
FIG. 7 illustrates an exemplary diagram of a displayer, according to an embodiment of the present teaching.

FIG. 7 illustrates an exemplary diagram of a displayer 410, according to an embodiment of the present teaching. As shown in FIG. 7, the displayer 410 in this example includes an input/output unit 702, a communication unit 704, a message analyzer 706, a secret value d generator 708, a parameter $g^d$ calculator 710, a parameter $k_d$ calculator 714, key derivation functions 715, a function value $F_{kd}(g^d)$ generator 716, random functions 717, a key value $g^{sd}$ generator 718, a visual code generator 720, and a key exchange accomplishment confirmation unit 722.

The input/output unit 702 in this example may receive a request from a user 150 for key exchange with a scanner, e.g. by receiving a user input activating an application stored on the displayer 410 to start a key exchange scheme as shown in FIG. 4. Upon receiving the request, the input/output unit 702 may activate the communication unit 704 to receive a message m' from an insecure channel and send the message to the message analyzer 706 for analysis.

The message analyzer 706 in this example analyzes the message m' to obtain a value of $g^s$ generated by the scanner for key exchange. The message analyzer 706 may then inform the secret value d generator 708 for generating a secret value d and send the value $g^s$ to the key value $g^{sd}$ generator 718 for generating a key value.

The secret value d generator 708 may generate a secret value d, e.g. based on a function that generates uniformity at random from the domain of integers. The secret value d generator 708 may send the secret value d to the parameter $g^d$ calculator 710 for generating a parameter $g^d$, to the parameter $k_d$ calculator 714 for generating parameter $k_d$, and to the key value $g^{sd}$ generator 718 for generating a key value. In addition, the secret value d generator 708 may send the value $g^s$ obtained from the message m' to the parameter $k_d$ calculator 714.

The parameter $g^d$ calculator 710 in this example receives the secret value d from the secret value d generator 708 and obtains the public parameter g to calculate the parameter $g^d$. The parameter $g^d$ calculator 710 may then send the parameter $g^d$ to the parameter $k_d$ calculator 714 for calculating the parameter $k_d$, and to the visual code generator 720 for generating a visual code.

The parameter $k_d$ calculator 714 may receive the secret value d and the value $g^s$ from the secret value d generator 708 and the parameter $g^d$ from the parameter $g^d$ calculator 710. Based on the values and parameters, the parameter $k_d$ calculator 714 can calculate a parameter $k_d$ using one of the key derivation functions 715. The used key derivation function may be predetermined and shared by the scanner and the displayer.

Based on the parameter $k_d$, the function value $F_{kd}(g^d)$ generator 716 may generate a function value $F_{kd}(g^d)$, based on one of the random functions 717, e.g. a pseudorandom function that is predetermined and shared by the scanner and the displayer. The function value $F_{kd}(g^d)$ generator 716 may then send the function value $F_{kd}(g^d)$ as a check value to the visual code generator 720 for encoding with a visual code.

The key value $g^{sd}$ generator 718 in this example obtains the value $g^s$ from the message analyzer 706 and the secret value d from the secret value d generator 708. The key value $g^{sd}$ generator 718 may generate the key value $g^{sd}$ based on the $g^s$ and the value d. The key value $g^{sd}$ generator 718 may send the generated key value $g^{sd}$ to the key exchange accomplishment confirmation unit 722 for confirmation of the key exchange accomplishment.

The visual code generator 720 in this example is configured for generating a visual code based on the parameter $g^d$ from the parameter $g^d$ calculator 710 and the check value $F_{kd}(g^d)$ from the function value $F_{kd}(g^d)$ generator 716, e.g. by encoding the parameter and value with a QR code or UPC code. The visual code generator 720 may then send the generated visual code to the input/output unit 702 for display.

The input/output unit 702 may display the visual code generated by the visual code generator 720, e.g. on a screen of the displayer 410, and receive a user input from the user 150 regarding whether the key exchange is successful. As discussed above, the user input may be a one bit communication from the user 150, based on an indication provided by the scanner to the user 150.

The key exchange accomplishment confirmation unit 722 in this example confirms whether the displayer 410 and the scanner are securely connected with a key, based on the user input from the input/output unit 702. If so, the key will have the value $g^{sd}$ generated by the key value $g^{sd}$ generator 718, such that the displayer 410 can use the key to have a secure connection with the scanner.

Figure 8:
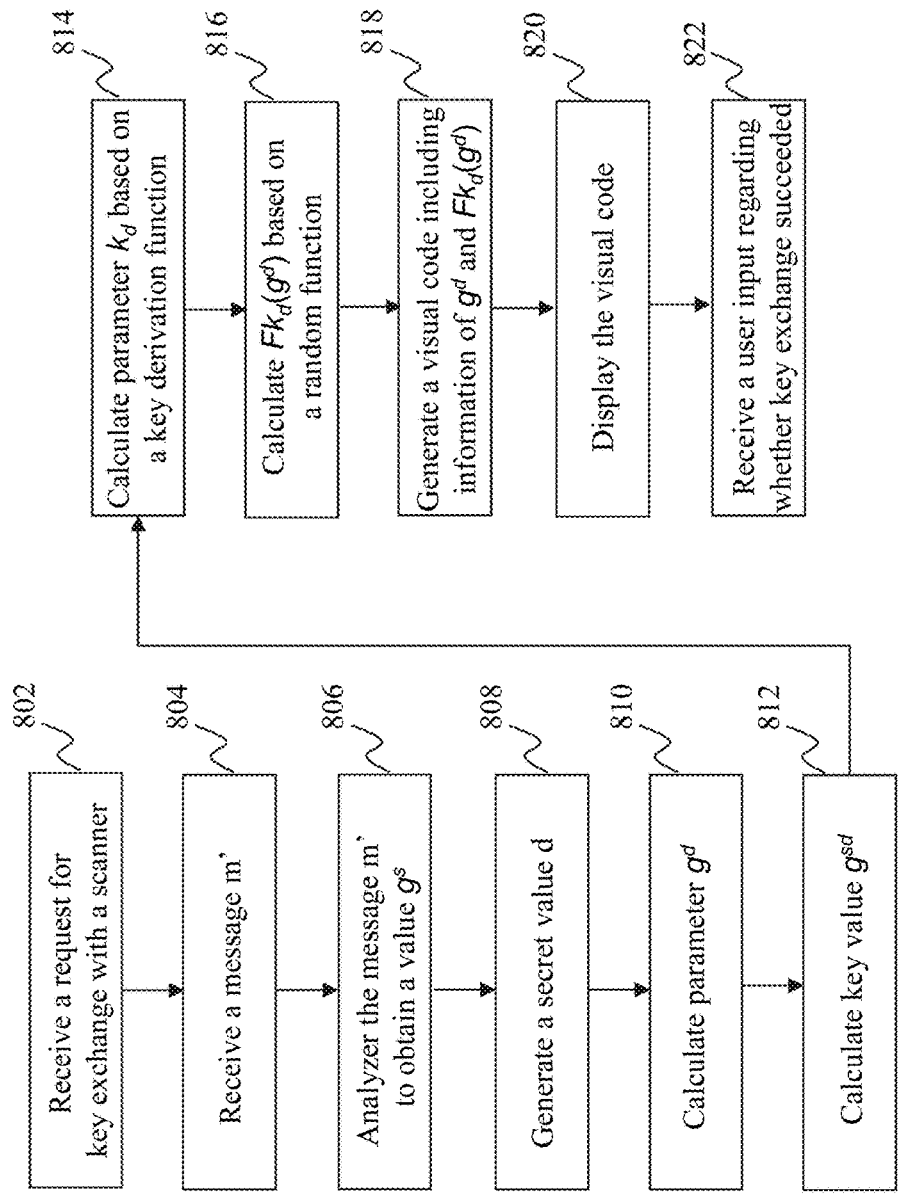
FIG. 8 is a flowchart of an exemplary process performed by a displayer, according to an embodiment of the present teaching.

FIG. 8 is a flowchart of an exemplary process performed by a displayer, e.g. the displayer 410 in FIG. 7, according to an embodiment of the present teaching. At 802, a request for exchanging a key with a scanner is received, e.g. from a user having access to both the displayer and the scanner. A message m' is received at 804, e.g. via an insecure channel. At 806, the message m' is analyzed to obtain a value $g^s$.

A secret value d is generated at 808, e.g. based on a uniformity random function. At 810, a parameter $g^d$ is calculated based on the secret value d and a public parameter g. A key value $g^{sd}$ is calculated at 812, based on the secret value d and the value $g^s$. At 814, a parameter $k_d$ is calculated based on a key derivation function. At 816, a check value $F_{kd}(g^d)$ is calculated based on a random function, e.g. a pseudorandom function. The check value $F_{ks}(g^d)$ and the parameter $g^d$ are encoded to generate a visual code at 818. At 820, the visual code is displayed, e.g. on a screen of the displayer. At 822, a user input is received to determine whether the key exchange is successful.

Figure 9:
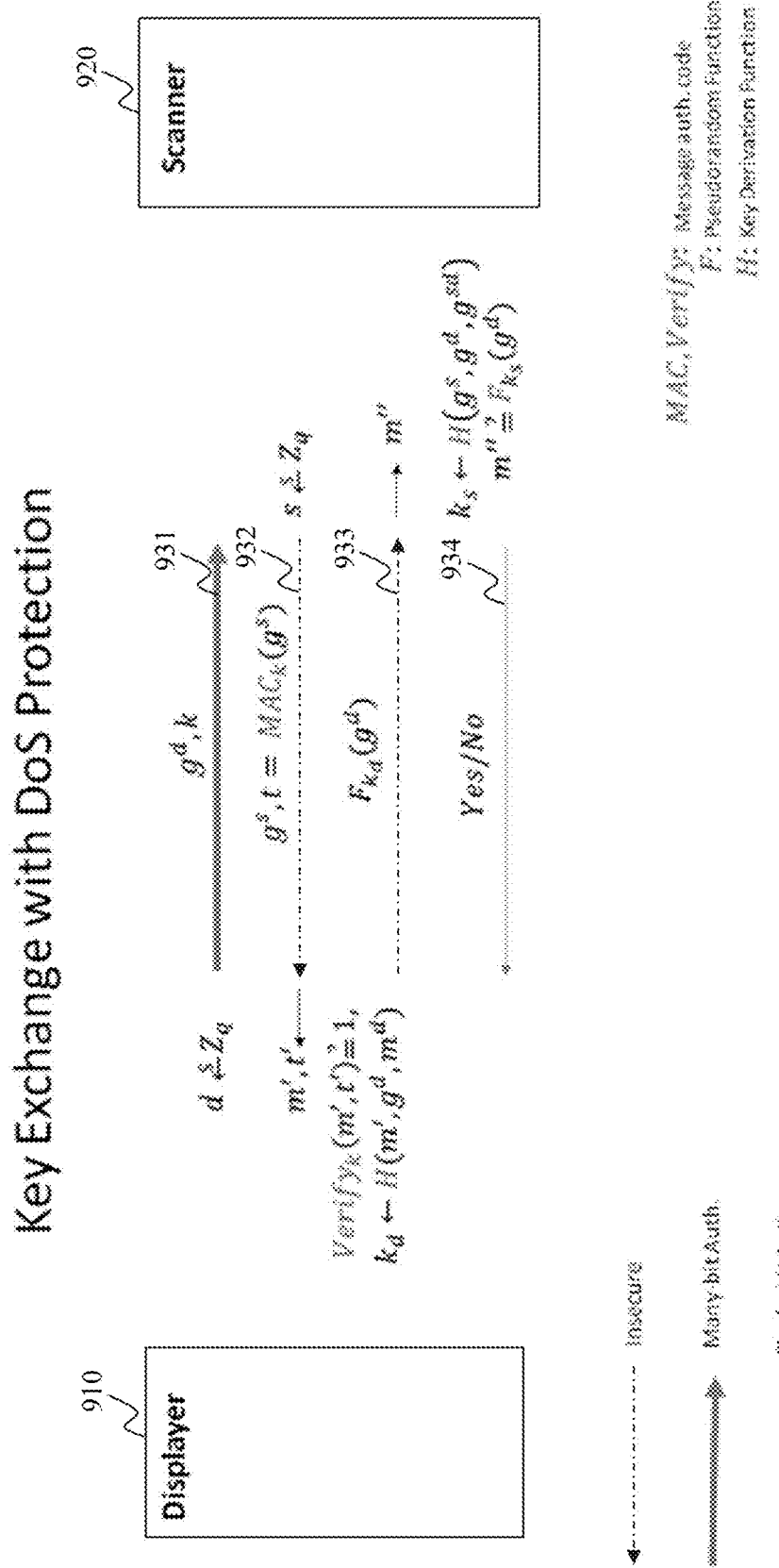
FIG. 9 illustrates another exemplary scheme of key exchange between a displayer and a scanner, according to an embodiment of the present teaching.

An adversary may launch a DoS attack to the key exchange by sending many group elements (fake values of $g^s$) to overwhelm the displayer 410. FIG. 9 illustrates another exemplary scheme of key exchange between a displayer and a scanner, to counteract this attack utilizing the security of a message authentication code, according to an embodiment of the present teaching. In this example, the displayer 910 and the scanner 920 are exchanging a key to each other, such that they can build trust to each other and expand trust of a secure network from one to the other. An application may be installed on both the displayer 910 and the scanner 920 and executed to facilitate the key exchange.

As shown in FIG. 9, there are four steps of communications between the displayer 910 and the scanner 920. In the description below regarding FIG. 9, it will be assumed that the trusted device is the displayer 910, and the untrusted device is the scanner 920. But it can be understood that these roles can be reversed in other scenarios, such that the trusted device is the scanner 920, and the untrusted device is the displayer 910, without changing the key exchange scheme.

After the displayer 910 receives a request for exchanging a key with the scanner 920, the displayer 910 may generate a secret value d. The request may come from a user activating the application. The secret value d may be a random number generated by the displayer 910, e.g. based on a function that generates uniformity at random from the domain of integers. The displayer 910 may generate a parameter $g^d$ based on a public parameter g of the scheme. The displayer 910 may also generate a check value k for the scanner 920 to generate a message authentication code.

In the first step 931, the displayer 910 may encode both the parameter $g^d$ and the check value k into a visual code and display the visual code on its screen, such that the scanner 920 can capture the visual code. As discussed above, this kind of visual channel communication can be very secure in practice as almost no one can physically interfere with the visual code capturing or fake a visual code for the scanner 920 to capture. The visual code may include multiple bits as it includes information of both the parameter $g^d$ and the check value k.

After the first step 931, the scanner 920 can extract the parameter $g^d$ and the check value k from the captured visual code. The scanner 920 may randomly generate another secret value s, and then calculate the parameter $g^s$ and the key value $g^{sd}$ which may be used for secure communication between the displayer 910 and the scanner 920, upon confirmation of successful key exchange later. Based on the parameter $g^s$ and the check value k, the scanner 920 can calculate a coded value $t=MAC_k(g^s)$, based on a message authentication code MAC.

In the second step 932, the scanner 920 transmits messages including information of the parameter $g^s$ and the coded value t to the displayer 910, e.g. over an untrusted or insecure network connection, where many intermediate parties may eavesdrop the communication.

After the second step 932, the displayer 910 can obtain the received message m' which is supposed to include $g^s$ and the received message t' which is supposed to include t. The scanner 920 may then calculate a coded value $\text{Verify}_k(m', t')$ to verify whether the received messages are correct, e.g. based on a verification function of a message authentication code. In one embodiment, if the communications so far are honest and correct, the coded value $\text{Verify}_k(m', t')$ will be equal to 1, and the received messages are verified. On the other hand, if there is some error in the previous communications, e.g. if a DoS attacker sends a fake value of $g^s$ to the displayer 910 during the insecure connection at the second step 932, the coded value $\text{Verify}_k(m', t')$ will not be equal to 1, and the received messages are not verified and will be dropped by the displayer 910. In this manner, the displayer 910 will be not be overwhelmed by the DoS attacker, as a buffer in the displayer 910 will not be overfilled with error messages.

If the received messages are not verified, the displayer 910 will drop them and wait for new messages. If the received messages are verified, the displayer 910 will analyze the received message m' to obtain the secret value s and calculate the key value $g^{sd}$ which will be used for secure communication between the displayer 910 and the scanner 920, upon confirmation of successful key exchange later. The displayer 910 may also generate a parameter $k_d$ based on a key derivation function H, e.g. by $k_d=H(m', g^d, m'^d)$. The displayer 910 can then calculate the value $F_{kd}(g^d)$ based on a random function F, e.g. a pseudorandom function, and the parameter $k_d$. The value $F_{kd}(g^d)$ will be used by the scanner 920 for determining whether the key exchange is successful or not.

In the third step 933, the displayer 910 transmits the value $F_{kd}(g^d)$ to the scanner 920, e.g. over an untrusted or insecure network connection, where many intermediate parties may eavesdrop the communication.

In one embodiment, the second step 932 and the third step 933 may be facilitated by an untrusted exchange server which can receive and forward messages between the scanner 920 and the displayer 910.

After the third step 933, the scanner 920 obtains the received message m" which is supposed to include the value $F_{kd}(g^d)$ generated by the displayer 910. Based on the parameters $g^s$, $g^d$, $g^{sd}$, and the key derivation function H, the scanner 920 may generate a parameter k s and calculate the value $F_{ks}(g^d)$ based on the random function F for determining whether the key exchange is successful. If the communications so far are honest and correct, the calculated value $F_{ks}(g^d)$ will be equal to the value $F_{kd}(g^d)$ extracted from the received message m", and the key value $g^{sd}$ can be confirmed to be correct key between the displayer 910 and the scanner 920. In this case, the scanner 920 may provide an indication to indicate that the displayer 910 and the scanner 920 are securely connected with the key $g^{sd}$. On the other hand, if there is some error in the previous communications, e.g. caused by some adversary during the insecure connection at the third step 933, the calculated value $F_{ks}(g^d)$ will not be equal to the value $F_{kd}(g^d)$ extracted from the received message m", and the key value $g^{sd}$ should be dropped and cannot be used as the key between the displayer 910 and the scanner 920. In this case, the scanner 920 may provide an indication to indicate that the key exchange fails and the displayer 910 and the scanner 920 are not securely connected.

In either case, the scanner 920 will provide an indication regarding whether the two devices are securely connected with a key after the third step 933. At the fourth step 934, this indication may be sent to the displayer 910 as a confirmation. In one embodiment, a user who observes the indication from the scanner 920 may provide an input on the displayer 910 such that the indication is forwarded to the displayer 910. For example, the displayer 910 shows two buttons: "YES" and "NO", on its screen after the third step 933. If the user sees the indication indicating that the key exchange is successful (i.e. the two devices are securely connected with the key), the user may press a "YES" button shown on the screen of the displayer 910 as a confirmation. On the other hand, if the user sees the indication indicating that the key exchange is not successful (i.e. the two devices are not securely connected with the key), the user may press a "NO" button shown on the screen of the displayer 910 as a confirmation. In another example, instead of showing both "YES" and "NO" buttons, the displayer 910 shows only one button, e.g. the "YES" button, such that unless the user presses the "YES" button to confirm a successful key exchange within a certain time period, the displayer 910 will determine the key exchange to be unsuccessful. The fourth step 934 may be a single bit communication as essentially one bit of information ("YES"! "NO") is sent to the displayer 910.

In another embodiment, the scanner 920 will calculate the key value $g^{sd}$ after the two devices are confirmed to be securely connected, i.e. after the calculated value $F_{ks}(g^d)$ is verified to be equal to the value $F_{kd}(g^d)$ extracted from the received message m".

Similar to the scheme in FIG. 4, the key exchange scheme shown in FIG. 9 can withstand an active attacker on the untrusted network connections (the second step 932 and the third step 933), a shoulder-surfer attacker who may eavesdrop the visual channel (the first step 931) and mount a man-in-the-middle attack on the network. In addition, the key exchange scheme in FIG. 9 can withstand a DoS attacker trying to overwhelm the devices, as both the displayer 910 and the scanner 920 have a verification to decide whether to keep a received message or drop it. This security can rely on the security of the message authentication code MAC. To attack in the scheme in FIG. 9, the DoS attacker has to be physically present at the time of the interaction between the devices to capture the visual code, which is extremely difficult if not impossible for the DoS attacker. Without losing effectiveness and security including avoiding the DoS attacker, the key exchange scheme in FIG. 9 includes just four steps, with little effort from the user, to improve efficiency.

Figure 10:
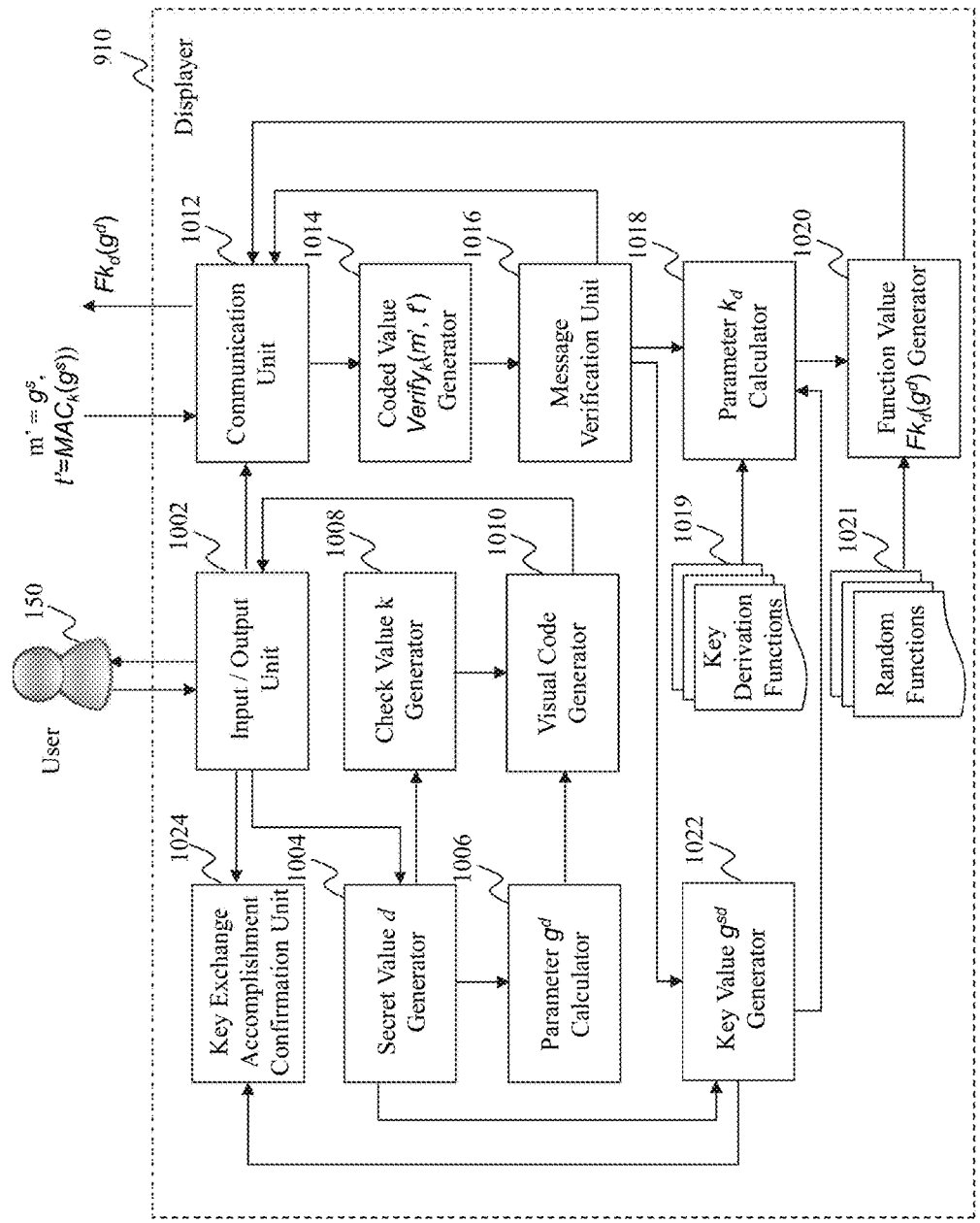
FIG. 10 illustrates another exemplary diagram of a displayer, according to an embodiment of the present teaching.

FIG. 10 illustrates another exemplary diagram of a displayer 910, according to an embodiment of the present teaching. As shown in FIG. 10, the displayer 910 in this example includes an input/output unit 1002, a secret value d generator 1004, a parameter $g^d$ calculator 1006, a check value k generator 1008, a visual code generator 1010, a communication unit 1012, a coded value $\text{Verify}_k(m', t')$ generator 1014, a message verification unit 1016, a parameter $k_d$ calculator 1018, key derivation functions 1019, a function value $F_{kd}(g^d)$ generator 1020, random functions 1021, a key value $g^{sd}$ generator 1022, and a key exchange accomplishment confirmation unit 1024.

The input/output unit 1002 in this example may receive a request from a user 150 for key exchange with a scanner, e.g. by receiving a user input activating an application stored on the displayer 910 to start a key exchange scheme as shown in FIG. 9. Upon receiving the request, the input/output unit 1002 may activate the secret value d generator 1004 to generate a secret value d, e.g. based on a function that generates uniformity at random from the domain of integers. The secret value d generator 1004 may inform the check value k generator 1008 to generate the check value k, and send the secret value d to the parameter $g^d$ calculator 1006 for generating a parameter $g^d$, and to the key value $g^{sd}$ generator 1022 for generating a key value.

The parameter $g^d$ calculator 1006 in this example receives the secret value d from the secret value d generator 1004 and obtains the public parameter g to calculate the parameter $g^d$. The parameter $g^d$ calculator 1006 may then send the parameter $g^d$ to the visual code generator 1010 for generating a visual code.

The check value k generator 1008 may randomly generate a check value k, upon receiving a signal from either the input/output unit 1002 or the secret value d generator 1004, and then send the check value k to the visual code generator 1010 for encoding with a visual code.

The visual code generator 1010 in this example is configured for generating a visual code based on the parameter $g^d$ from the parameter $g^d$ calculator 1006 and the check value k from the check value k generator 1008, e.g. by encoding the parameter and value with a QR code or UPC code. The visual code generator 1010 may then send the generated visual code to the input/output unit 1002 for display.

The input/output unit 1002 may display the visual code generated by the visual code generator 1010, e.g. on a screen of the displayer 910, and activate the communication unit 1012 to receive message m' and t' from an insecure channel. The communication unit 1012 may then send the messages to the coded value $\text{Verify}_k(m', t')$ generator 1014 for analysis.

The message m' is supposed to include the value $g^s$ generated by the scanner; and the message t' is supposed to include the coded value $\text{MAC}_k(g^s)$ generated by the scanner based on the check value k. The coded value $\text{Verify}_k(m', t')$ generator 1014 in this example generates a coded value $\text{Verify}_k(m', t')$ based on the received messages and the check value k, e.g. using a message authentication code function Verify.

The message authentication code function Verify is chosen such that when the received messages correctly include the information generated from the scanner, the coded value $\text{Verify}_k(m', t')$ is equal one; and when the received messages do not correctly include the information generated from the scanner, the coded value $\text{Verify}_k(m', t')$ is not equal one. Based on the calculated value from the coded value $\text{Verify}_k(m', t')$ generator 1014, the message verification unit 1016 can then determine whether the received messages are verified to include the correct information (e.g. $g^s$ and $\text{MAC}_k(g^s)$) generated from the scanner. When the received messages are not verified, the message verification unit 1016 can drop the received messages and inform the communication unit 1012 to wait for new messages. When the received messages are verified, the message verification unit 1016 can send the received messages to the key value $g^{sd}$ generator 1022 for generating a key value and to the parameter $k_d$ calculator 1018 for generating a parameter $k_d$.

The parameter $k_d$ calculator 1018 in this example receives the value $g^s$ in the message m' from the message verification unit 1016 and receives the secret value d from the key value $g^{sd}$ generator 1022 that can forward the value d generated by the secret value d generator 1004 to the parameter $k_d$ calculator 1018. Based on these values, the parameter $k_d$ calculator 1018 can calculate a parameter $k_d$ using one of the key derivation functions 1019. The used key derivation function may be predetermined and shared by the scanner and the displayer.

Based on the parameter $k_d$, the function value $F_{kd}(g^d)$ generator 1020 may generate a function value $F_{kd}(g^d)$, based on one of the random functions 1021, e.g. a pseudorandom function that is predetermined and shared by the scanner and the displayer. The function value $F_{kd}(g^d)$ generator 1020 may then send the function value $F_{kd}(g^d)$ as another check value to the communication unit 1012 for transmitting to the scanner, e.g. over an untrusted or insecure network connection.

The key value $g^{sd}$ generator 1022 in this example obtains the value $g^s$ from the message verification unit 1016 and obtains the secret value d from the secret value d generator 1004. The input/output unit 1002 may generate the key value $g^{sd}$ based on the $g^s$ and the value d. The key value $g^{sd}$ generator 1022 may send the generated key value $g^{sd}$ to the key exchange accomplishment confirmation unit 1024 for confirmation of the key exchange accomplishment.

The key exchange accomplishment confirmation unit 1024 in this example confirms whether the displayer 910 and the scanner are securely connected with a key, based on a user input received by the input/output unit 1002 from the user 150. If so, the key will have the value $g^{sd}$ generated by the key value $g^{sd}$ generator 1022, such that the displayer 910 can use the key to have a secure connection with the scanner. The user input may be a one bit communication from the user 150, based on an indication provided by the scanner to the user 150.

Figure 11:
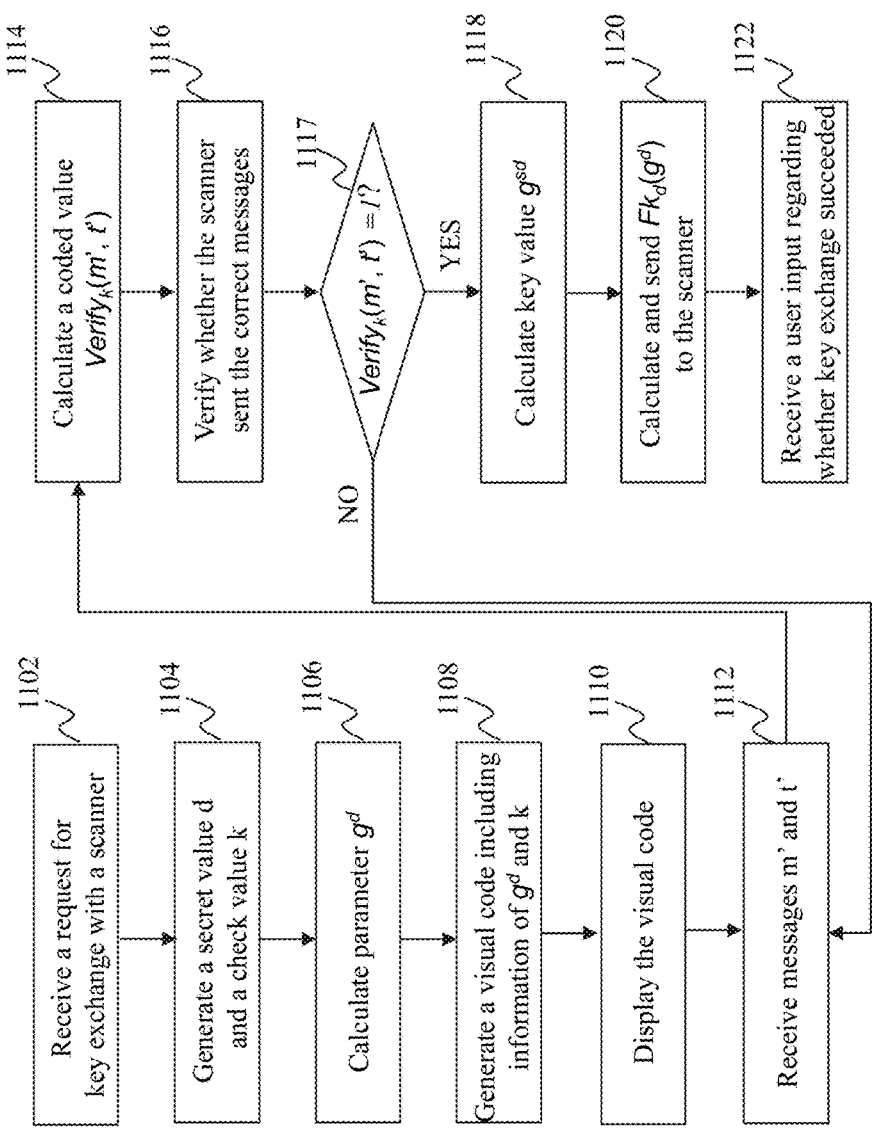
FIG. 11 is a flowchart of another exemplary process performed by a displayer, according to an embodiment of the present teaching.

FIG. 11 is a flowchart of another exemplary process performed by a displayer, e.g. the displayer 910 in FIG. 10, according to an embodiment of the present teaching. At 1102, a request for exchanging a key with a scanner is received, e.g. from a user having access to both the displayer and the scanner. A secret value d and a check value k are generated at 1104, e.g. based on a uniformity random function. At 1106, a parameter $g^d$ is calculated based on the secret value d and a public parameter g. The check value k and the parameter $g^d$ are encoded to generate a visual code at 1108. At 1110, the visual code is displayed, e.g. on a screen of the displayer.

Message m' and t' are received at 1112, e.g. via an insecure channel. At 1114, the messages are used to calculate a coded value Verify$_k$(m', t'), based on a message authentication code function Verify. At 1116, it is determined whether the received messages correctly include the information from the scanner, e.g. by comparing the coded value Verify$_k$(m', t') with 1 to obtain the comparison result at 1117.

If the messages are not verified, i.e. if Verify$_k$(m', t')≠1 at 1117, the process goes to 1112 to receive new messages. If the messages are verified, i.e. if Verify$_k$(m', t')=1 at 1117, the process continues to 1118, where a key value $g^{sd}$ is calculated, based on the secret value d and the value $g^s$. At 1120, another check value $F_{kd}(g^d)$ is calculated, e.g. based on a pseudorandom function and a parameter $k_d$ generated based on a key derivation function. At 1122, a user input is received to determine whether the key exchange is successful.

Figure 12:
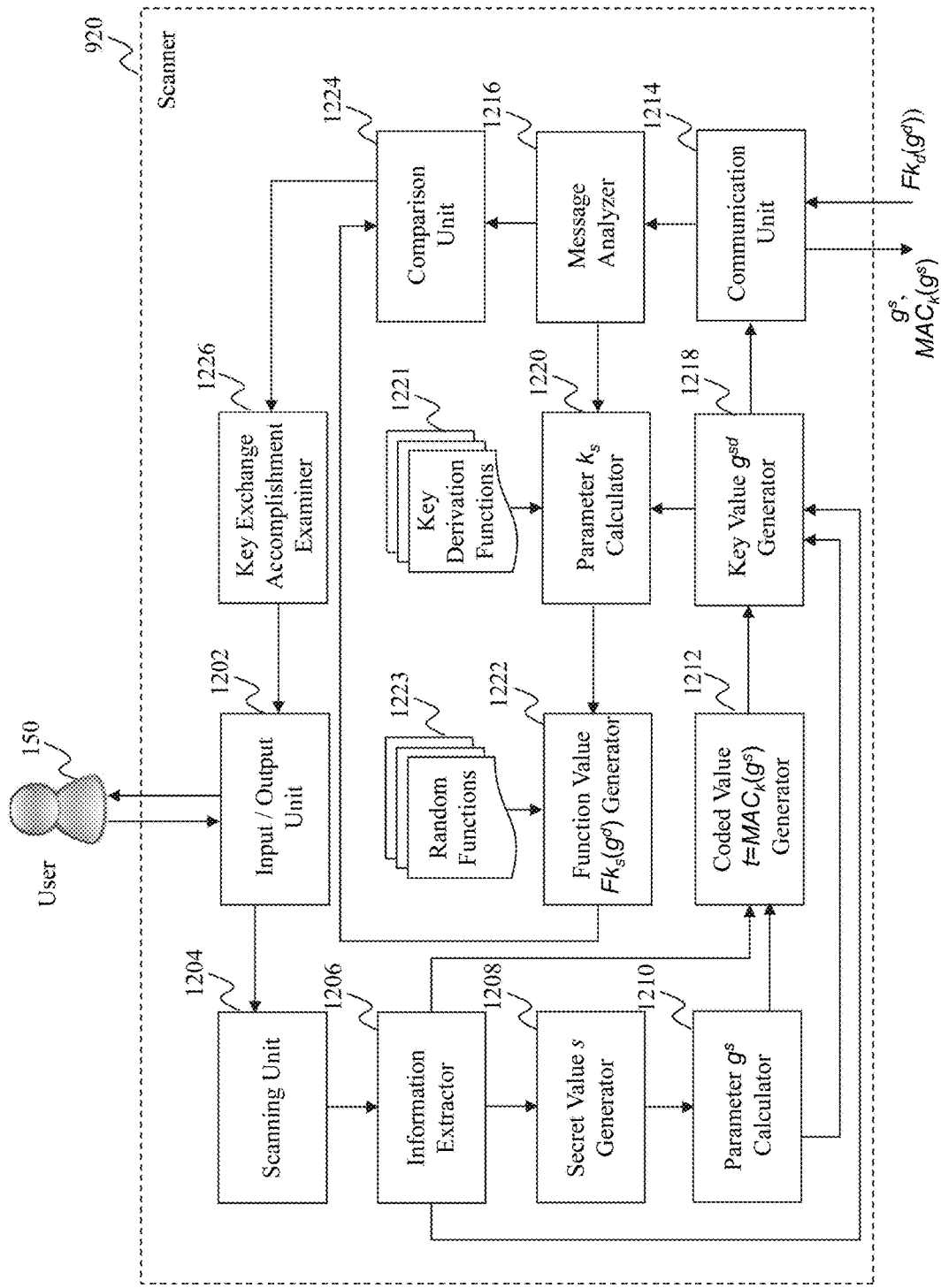
FIG. 12 illustrates another exemplary diagram of a scanner, according to an embodiment of the present teaching.

FIG. 12 illustrates another exemplary diagram of a scanner 920, according to an embodiment of the present teaching. The scanner 920 in this example includes an input/output unit 1202, a scanning unit 1204, an information extractor 1206, a secret value s generator 1208, a parameter $g^s$ calculator 1210, a coded value t=MAC$_k$($g^s$) generator 1212, a communication unit 1214, a message analyzer 1216, a key value $g^{sd}$ generator 1218, a parameter $k_s$ calculator 1220, key derivation functions 1221, a function value $F_{ks}(g^d)$ generator 1222, random functions 1223, a comparison unit 1224, and a key exchange accomplishment examiner 1226.

The input/output unit 1202 in this example may receive a request from a user 150 for key exchange with a displayer, e.g. by receiving a user input activating an application stored on the scanner 920 to start a key exchange scheme as shown in FIG. 9. Upon receiving the request, the input/output unit 1202 may output an instruction to the user 150 for capturing a visual code to be displayed on the displayer (trusted device). For example, the instruction may include a sentence like "please turn on the camera to scan the QR code displayed on the displayer."

The scanning unit 1204 in this example is configured for capturing a visual code displayed on the displayer, e.g. by scanning a QR code with a camera. The scanning unit 1204 may be activated by the user following the instruction given via the input/output unit 1202, or be activated by the input/output unit 1202 directly. In the latter case, the instruction to the user may include a sentence like "please use this camera to scan the QR code displayed on the displayer." With the help of the user, the scanning unit 1204 can capture the visual code which includes information about key exchange from the displayer, and send it to the information extractor 1206.

The information extractor 1206 in this example extracts information from the captured visual code, to obtain e.g. $g^d$ and check value k as shown in FIG. 9. The information extractor 1206 may send the $g^d$ to the key value $g^{sd}$ generator 1218 for generating the key value $g^{sd}$, and send the check value k to the coded value t=MAC$_k$($g^s$) generator 1212 for generating a coded value.

The secret values generator 1208 in this example is configured for generating a secret value s, e.g. based on a function that generates uniformity at random from the domain of integers, and send the secret value s to the parameter $g^s$ calculator 1210.

The parameter $g^s$ calculator 1210 in this example receives the secret value s from the secret value s generator 1208 and obtains the public parameter g to calculate the parameter $g^s$. The parameter $g^s$ calculator 1210 may then send the parameter $g^s$ to the coded value t=MAC$_k$($g^s$) generator 1212 for generating a coded value and forward the secret value s and/or the parameter $g^s$ to the key value $g^{sd}$ generator 1218 for generating the key value $g^{sd}$.

The coded value t=MAC$_k$($g^s$) generator 1212 in this example may receive the check value k from the information extractor 1206 and the parameter $g^s$ from the parameter $g^s$ calculator 1210. Based on the value and parameter, the coded value t=MAC$_k$($g^s$) generator 1212 may generate a coded value t=MAC$_k$($g^s$), using a message authentication code MAC, and send the coded value t to the communication unit 1214 for transmission to the displayer, either directly or via the key value $g^{sd}$ generator 1218 as shown in FIG. 12.

The key value $g^{sd}$ generator 1218 in this example obtains the $g^d$ from the information extractor 1206 and obtains the secret value s from the parameter $g^s$ calculator 1210. The key value $g^{sd}$ generator 1218 may generate the key value $g^{sd}$ based on the $g^d$ and the values. The key value $g^{sd}$ d generator 1218 may then send the generated key value $g^{sd}$ and the values $g^s$, $g^d$ to the parameter $k_s$ calculator 1220 for calculating a parameter $k_s$.

The communication unit 1214 in this example may transmit the parameter $g^s$ and the coded value t to the displayer, e.g. over an insecure connection on an untrusted network. After the transmission, the communication unit 1214 may receive a message m" from the displayer, e.g. over the insecure channel, and send the message to the message analyzer 1216.

The message analyzer 1216 may analyze the message m" to obtain another check value $F_{kd}(g^d)$ that is supposed to be generated by the displayer. The message analyzer 1216 may then inform the parameter $k_s$ calculator 1220 for generating a parameter $k_s$ and send the check value $F_{kd}(g^d)$ to the comparison unit 1224 for comparing the check value $F_{kd}(g^d)$ with a test value $F_{ks}(g^d)$ generated based on the parameter $k_s$.

The parameter $k_s$ calculator 1220 in this example obtains the values $g^d$, $g^s$, and the key value $g^{sd}$ from the key value $g^{sd}$ generator 1218. Based on those values, the parameter $k_s$ calculator 1220 can calculate a parameter $k_s$ using one of the key derivation functions 1221. The used key derivation function may be predetermined and shared by the scanner and the displayer.

Based on the parameter $k_s$, the function value $F_{ks}(g^d)$ generator 1222 may generate a function value $F_{ks}(g^d)$, based on one of the random functions 1223, e.g. a pseudorandom function that is predetermined and shared by the scanner and the displayer. The function value $F_{ks}(g^d)$ generator 1222 may then send the function value $F_{ks}(g^d)$ as a test value to the comparison unit 1224 for comparison with a check value.

The comparison unit 1224 in this example receives the test value $F_{ks}(g^d)$ from the function value $F_{ks}(g^d)$ generator 1222 and receives the check value $F_{kd}(g^d)$ from the message analyzer 1216. The comparison unit 1224 may compare $F_{kd}(g^d)$ with $F_{ks}(g^d)$ to determine whether they are equal, and send the comparison result to the key exchange accomplishment examiner 1226.

The key exchange accomplishment examiner 1226 can determine whether the key exchange is successful based on the comparison result from the comparison unit 1224. When $F_{kd}(g^d)$ equals $F_{ks}(g^d)$, the key exchange accomplishment examiner 1226 may determine that the key exchange is accomplished successfully, and instruct the input/output unit 1202 to output an indication that the two devices are securely connected to each other with a key. Then, the scanner 920 can use the key $g^{sd}$ to securely encrypt information to be communicated with the displayer. When $F_{kd}(g^d)$ does not equal $F_{ks}(g^d)$, the key exchange accomplishment examiner 1226 may determine that the key exchange fails, and instruct the input/output unit 1202 to output an indication that the two devices are not securely connected to each other with a key.

The input/output unit 1202 may provide to the user 150 the corresponding indication based on the instruction from the key exchange accomplishment examiner 1226, e.g. by an icon, a text, a voice, a shining light, a ring, a vibration, or an image. The indication may inform the user 150 the result of the key exchange and instruct the user 150 to forward the result to the displayer, e.g. by inputting on the displayer.

Figure 13:
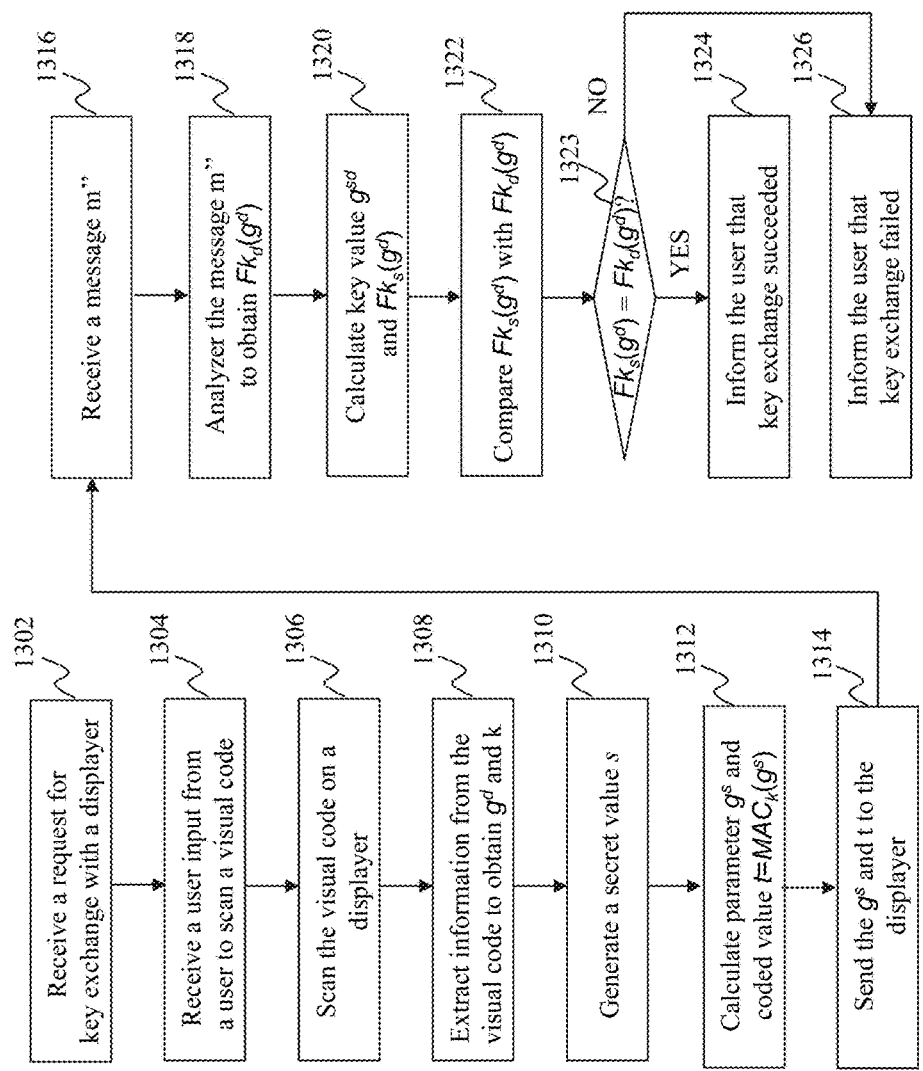
FIG. 13 is a flowchart of another exemplary process performed by a scanner, according to an embodiment of the present teaching.

FIG. 13 is a flowchart of another exemplary process performed by a scanner, e.g. the scanner 920 in FIG. 12, according to an embodiment of the present teaching. At 1302, a request for exchanging a key with a displayer is received, e.g. from a user having access to both the displayer and the scanner. A user input is received at 1304 from the user to capture a visual code, e.g. to scan a QR code. In an embodiment, the user may be instructed to provide the input, e.g. after holding a camera on top of the visual code. The visual code is captured or scanned at 1306. At 1308, information is extracted from the captured visual code to obtain e.g. a parameter $g^d$ and a check value k.

A secret value s is generated at 1310, e.g. based on a uniformity random function. At 1312, a parameter $g^s$ is calculated based on the secret value s and a public parameter g and a coded value $t=MAC_k(g^s)$ is calculated based on the parameter $g^s$, the check value k, and a message authentication code MAC. The parameter $g^s$ and the coded value t are sent to the displayer at 1314, e.g. by messages via an insecure channel.

At 1316, a message m" is received, e.g. over an insecure channel. The message m" is analyzed at 1318 to obtain another check value $F_{kd}(g^d)$ that is supposed to be generated by the displayer. At 1320, a key value $g^{sd}$ is generated based on the $g^d$ and the secret value s, and a test value $F_{ks}(g^d)$ is calculated based on a pseudorandom function and a parameter $k_s$ calculated based on a key derivation function. The test value $F_{ks}(g^d)$ is compared with the check value $F_{kd}(g^d)$ at 1322 and it is determined whether the $F_{ks}(g^d)$ is equal to the $F_{kd}(g^d)$ at 1323. If so, the process goes to 1324, where the user is informed that the key exchange is successful by an indication. Otherwise, the process goes to 1326, where the user is informed that the key exchange fails by another indication.

Figure 14:
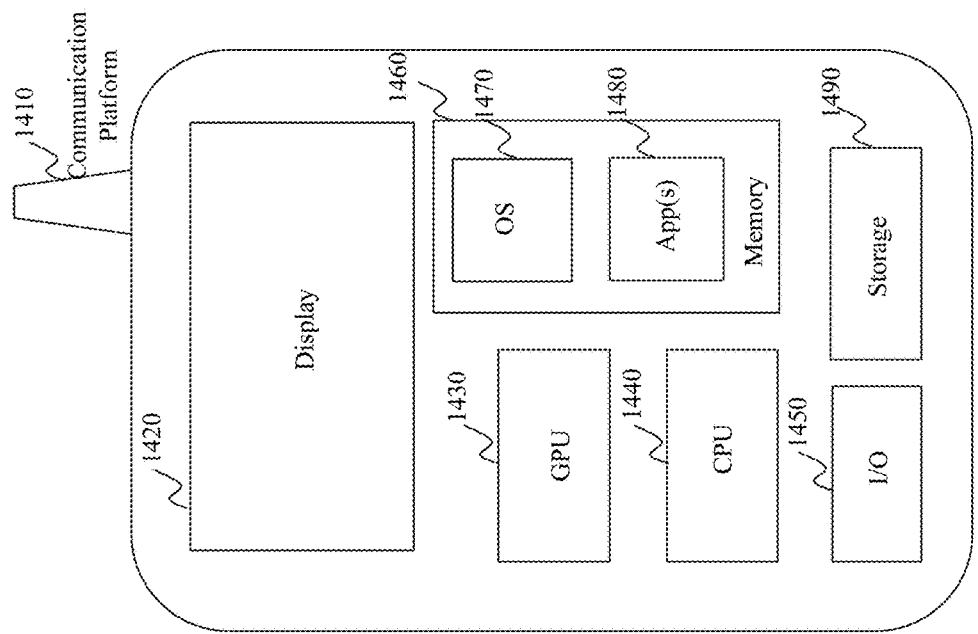
FIG. 14 depicts the architecture of a mobile device which can be used to implement a specialized system incorporating the present teaching.

FIG. 14 depicts the architecture of a mobile device which can be used to realize a specialized system implementing the present teaching. In this example, the trusted device or the untrusted device (the displayer or the scanner) is a mobile device 1400, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1400 in this example includes one or more central processing units (CPUs) 1440, one or more graphic processing units (GPUs) 1430, a display 1420, a memory 1460, a communication platform 1410, such as a wireless communication module, storage 1490, and one or more input/output (I/O) devices 1450. Any other suitable component, including but not limited to a system bus or a controller (not shown), may also be included in the mobile device 1400. As shown in FIG. 14, a mobile operating system 1470, e.g., iOS, Android, Windows Phone, etc., and one or more applications 1480 may be loaded into the memory 1460 from the storage 1490 in order to be executed by the CPU 1440. The applications 1480 may include a browser or any other suitable mobile apps for key exchange between the mobile device 1400 and another device. User interactions with the device 1400 may be achieved via the I/O devices 1450.

To implement various modules, units, and their functionalities described in the present disclosure, computer hardware platforms may be used as the hardware platform(s) for one or more of the elements described herein (e.g., the end-to-end exchange server 130, the trusted devices 110, the untrusted device 115, and/or other components of the systems 100 and 200 described with respect to FIGS. 1-13). The hardware elements, operating systems and programming languages of such computers are conventional in nature, and it is presumed that those skilled in the art are adequately familiar therewith to adapt those technologies to key exchange as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
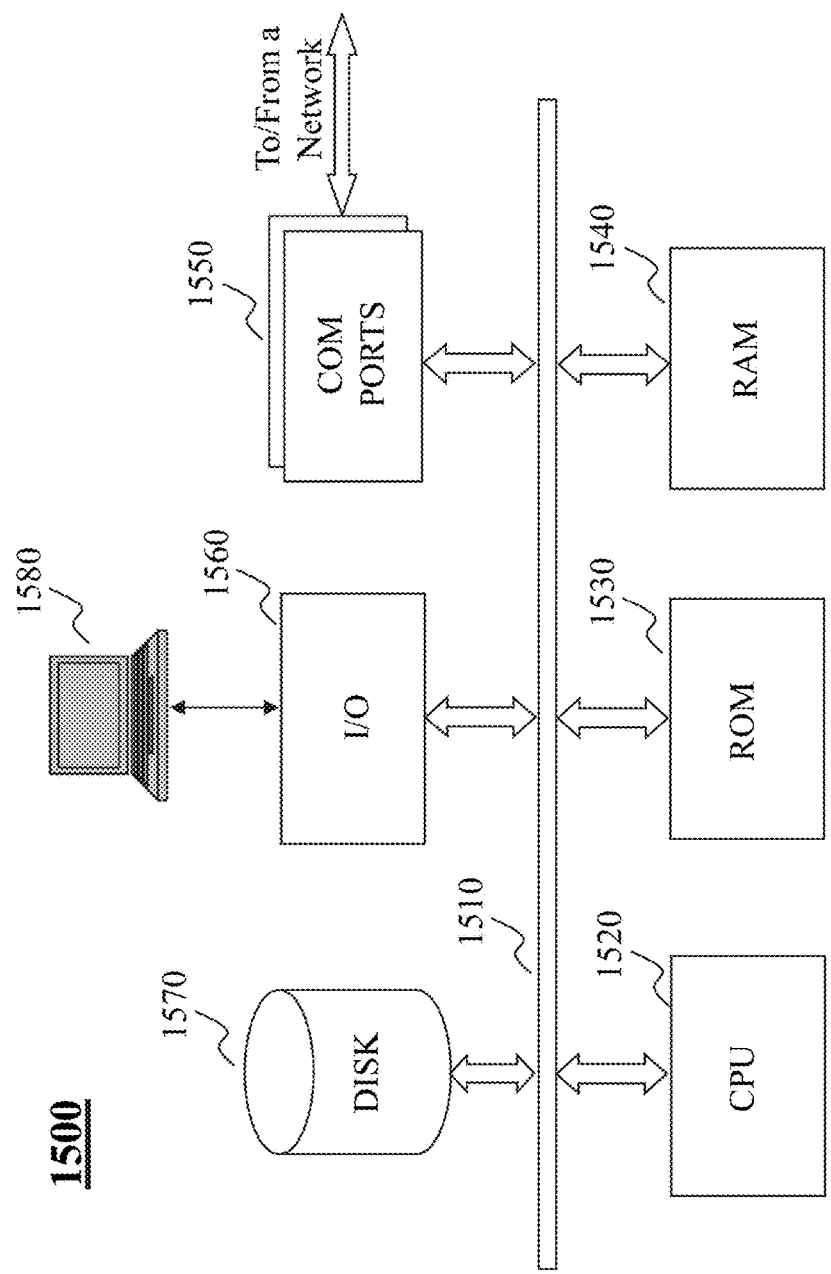
FIG. 15 depicts the architecture of a computer which can be used to implement a specialized system incorporating the present teaching.

FIG. 15 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1500 may be used to implement any component of the key exchange techniques, as described herein. For example, the untrusted device 115, etc., may be implemented on a computer such as computer 1500, via its hardware, software program, firmware, or a combination thereof. Although only one such computer is shown, for convenience, the computer functions relating to key exchange as described herein may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of key exchange, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with key exchange techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the key exchange as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for exchanging a key with a device, the method comprising:
   receiving a message from the device;
   generating a secret value;
   creating a cryptographic key based on the message and the secret value;
   generating a visual code based on the secret value, wherein the visual code includes first information and second information; and
   providing, for display, the visual code which is to be captured by the device, wherein the device is to calculate a test value based on the first information and determine whether the device is securely connected based on the test value.

2. The method of claim 1, wherein the message is received over an insecure channel on the network.

3. The method of claim 1, wherein the visual code is a one-dimensional barcode or two-dimensional barcode and is to be scanned by the device with a camera.

4. The method of claim 1, wherein the test value is calculated by at least the following:
   generating a key value based on the first information;
   calculating a parameter based on a key derivation function and the key value; and
   calculating the test value based on the parameter and a pseudorandom function.

5. The method of claim 1, wherein whether the device is securely connected is determined by at least the following:
   extracting a check value from the second information;
   comparing the test value with the check value to generate a comparison result; and
   determining whether the device is securely connected based on the comparison result.

6. The method of claim 1, further comprising:
   obtaining an indication regarding whether the device is securely connected from a user who has access to the device.

7. The method of claim 1, further comprising:
   receiving a coded value from the device over an insecure channel on the network, wherein the coded value is calculated by the device based on a first check value included in the second information;
   determining whether the message is verified based on the message and the coded value;
   transmitting third information to the device over an insecure channel on the network, when the message is verified; and
   dropping the message when the message is not verified.

8. The method of claim 7, wherein whether the device is securely connected is determined by at least the following:
   extracting a second check value from the third information;
   comparing the test value with the second check value to generate a comparison result; and
   determining whether the device is securely connected based on the comparison result.

9. A system, having at least one processor, storage, and a communication platform connected to a network for exchanging a key with a device, the system comprising:
- a communication unit configured for receiving a message from the device;
- a secret value generator configured for generating a secret value;
- a key value generator configured for creating a cryptographic key based on the message and the secret value;
- a visual code generator configured for generating a visual code based on the secret value, wherein the visual code includes first information and second information; and
- an input/output unit configured for providing, for display, the visual code which is to be captured by the device, wherein the device is to calculate a test value based on the first information and determine whether the device is securely connected based on the test value.

10. The system of claim 9, wherein the message is received over an insecure channel on the network.

11. The system of claim 9, wherein the visual code is a one-dimensional barcode or two-dimensional barcode and is to be scanned by the device with a camera.

12. The system of claim 9, wherein the test value is calculated by at least one of the following:
- generating a key value based on the first information;
- calculating a parameter based on a key derivation function and the key value; and
- calculating the test value based on the parameter and a pseudorandom function.

13. The system of claim 9, wherein whether the device is securely connected is determined by at least the following:
- an information extractor configured for extracting a check value from the second information; and
- a comparison unit configured for:
  - comparing the test value with the check value to generate a comparison result; and
  - determining whether the device is securely connected based on the comparison result.

14. The system of claim 9, wherein the input/output unit is further configured for:
- obtaining an indication regarding whether the device is securely connected from a user who has access to the device.

15. The system of claim 9, further comprising a message verification unit, wherein:
- the communication unit is further configured for receiving a coded value from the device over an insecure channel on the network, wherein the coded value is calculated by the device based on a check value included in the second information;
- the message verification unit is configured for determining whether the message is verified based on the message and the coded value;
- the communication unit is further configured for transmitting third information to the device over an insecure channel on the network, when the message is verified; and
- the message verification unit is further configured for dropping the message when the message is not verified.

16. The system of claim 15, wherein whether the device is securely connected is determined by at least the following:
- an information extractor configured for extracting a second check value from the third information; and
- a comparison unit configured for:
  - comparing the test value with the second check value to generate a comparison result; and
  - determining whether the device is securely connected based on the comparison result.

17. A machine-readable tangible and non-transitory medium having instructions for exchanging a key with a device, wherein the instructions, when read by the machine, causes the machine to perform the following:
- receiving a message from the device;
- generating a secret value;
- creating a cryptographic key based on the message and the secret value;
- generating a visual code based on the secret value, wherein the visual code includes first information and second information; and
- providing, for display, the visual code which is to be captured by the device, wherein the device is to calculate a test value based on the first information and determine whether the device is securely connected based on the test value.

18. The machine-readable tangible and non-transitory medium of claim 17, wherein the visual code is a one-dimensional barcode or two-dimensional barcode and is to be scanned by the device with a camera.

19. The machine-readable tangible and non-transitory medium of claim 17, wherein the instructions, when read by the machine, causes the machine to further perform the following:
- obtaining an indication regarding whether the device is securely connected from a user who has access to the device.

20. The machine-readable tangible and non-transitory medium of claim 17, wherein the instructions, when read by the machine, causes the machine to further perform the following:
- receiving a coded value from the device over an insecure channel on the network, wherein the coded value is calculated by the device based on a first check value included in the second information;
- determining whether the message is verified based on the message and the coded value;
- transmitting third information to the device over an insecure channel on the network, when the message is verified; and
- dropping the message when the message is not verified.

* * * * *